(12) United States Patent
Zhou et al.

(10) Patent No.: US 8,837,326 B2
(45) Date of Patent: Sep. 16, 2014

(54) SESSION MANAGEMENT METHOD AND SYSTEM BASED ON M2M APPLICATION, AND APPARATUS

(75) Inventors: Han Zhou, Shanghai (CN); Wenfu Wu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 66 days.

(21) Appl. No.: 13/572,624

(22) Filed: Aug. 11, 2012

(65) Prior Publication Data

US 2012/0307798 A1 Dec. 6, 2012

Related U.S. Application Data

(63) Continuation of application No. PCT/CN2011/070853, filed on Jan. 31, 2011.

(30) Foreign Application Priority Data

Feb. 11, 2010 (CN) .......................... 2010 1 0111544

(51) Int. Cl.
| | |
|---|---|
| *H04L 12/28* | (2006.01) |
| *H04W 4/00* | (2009.01) |
| *H04W 72/12* | (2009.01) |
| *H04W 28/02* | (2009.01) |
| *H04W 76/04* | (2009.01) |

(52) U.S. Cl.
CPC ............ *H04W 4/00* (2013.01); *H04W 28/0215* (2013.01); *H04W 72/121* (2013.01); *H04W 76/04* (2013.01)
USPC .......................................... 370/254; 370/331

(58) Field of Classification Search
CPC .................................................. H04W 4/0005

USPC ......................................................... 370/254
See application file for complete search history.

(56) References Cited

U.S. PATENT DOCUMENTS

| | | | |
|---|---|---|---|
| 2008/0263207 | A1 | 10/2008 | Popescu et al. |
| 2009/0129342 | A1 | 5/2009 | Hwang et al. |

(Continued)

FOREIGN PATENT DOCUMENTS

| | | |
|---|---|---|
| CN | 101087446 A | 12/2007 |
| CN | 101472271 A | 7/2009 |

(Continued)

OTHER PUBLICATIONS

Alcatel-Lucent Shanghai Bell, "Network Improvement for group based mobility," 3GPP TSG SA WG2 Meeting #77, TD S2-100410, Shenzhen, China, Jan. 18-22, 2010, 4 pages.

(Continued)

*Primary Examiner* — Shaq Taha
(74) *Attorney, Agent, or Firm* — Slater & Matsil, L.L.P.

(57) ABSTRACT

Embodiments of the present invention disclose a session management method and system based on an M2M application and an apparatus. The method includes: first acquiring gateway equipment information and group number information of a group user device; when acquiring that group information of the group user device changes, according to the gateway equipment information and the group number information of the group user device, instructing a gateway equipment to execute bearer change processing on the group device, and executing the bearer change processing on the group user device, so as to reduce signaling congestion on a network side and correspondingly reduce a network load.

15 Claims, 6 Drawing Sheets

Acquire mobility management network element information and group number information of a group user equipment — D101

Acquire that group information of the group user equipment changes, and according to the mobility management network element information and the group number information of the group user equipment, instruct a mobility management network element to execute bearer change processing on the group user equipment, and execute the bearer change processing on the group user equipment — D102

(56) References Cited

U.S. PATENT DOCUMENTS

| | | | |
|---|---|---|---|
| 2010/0220662 A1* | 9/2010 | Di et al. | 370/328 |
| 2012/0039213 A1* | 2/2012 | Cheng et al. | 370/254 |
| 2012/0039313 A1* | 2/2012 | Jain | 370/338 |
| 2012/0220326 A1* | 8/2012 | Li et al. | 455/509 |
| 2012/0287854 A1* | 11/2012 | Xie et al. | 370/328 |

FOREIGN PATENT DOCUMENTS

| | | | |
|---|---|---|---|
| EP | 2 139 280 A1 | | 12/2009 |
| JP | 2009-246772 | | 10/2009 |
| JP | 2011-504035 | | 1/2011 |
| WO | WO 2006/053503 A1 | | 5/2006 |
| WO | 2009063434 | | 5/2009 |

OTHER PUBLICATIONS

Ericsson, et al., "APN based solution for MTC Groups," 3GPP TSG SA WG2 Meeting #77, TD S2-100393, Shenzhen, China, Jan. 18-22, 2010, 8 pages.

Extended European Search Report received in Application No. 11741893.9-2413, Applicant Huawei Technologies Co., Ltd., Dec. 20, 2012, 12 pages.

Huawei, "Network Improvement for Group Based Policing," 3GPP TSG SA WG2 Meeting #77, TD S2-100243, Shenzhen, China, Jan. 18-22, 2010, 2 pages.

Huawei, "Network Improvement for Group Based Policing," 3GPP TSG SA WG2 Meeting #78, TD S2-101079, San Francisco, USA, Feb. 22-26, 2010, 3 pages.

InterDigital Communication Corporation, "Group based RAB & IP assignment for TS 22.368," 3GPP TSG-SA #49, S1-100140, San Francisco, USA, Feb. 22-26, 2010, 2 pages.

Samsung, "MTC Group Based Policing," 3GPP TSG SA WG2 Meeting #77, TD S2-100558, Shenzhen, China, Jan. 18-22, 2010, 2 pages.

Zte, "The group bearer for MTC," 3GPP TSG SA WG2 Meeting #78, TD S2-100995, San Francisco, USA, Feb. 22-26, 2010, 1 page.

Zte, "The group bearer for MTC," 3GPP TSG SA WG2 Meeting #77, TD S2-100094, Shenzhen, China, Jan. 18-22, 2010, 2 pages.

"$3^{rd}$ Generation Partnership Project; Technical Specificaton Group Services and System Aspects; Study on Facilitating Machine to Machine Communicaton in 3GPP Systems; (Release 8)," 3GPP TR 22.868 V8.0.0, (Mar. 2007), 15 pages.

"$3^{rd}$ Generation Partnership Project; Technical Specification Group Services and System Aspects; Extended support of IP Multimedia Subsystem (IMS) emergency sessions (Release 9)," 3GPP TR 23.868 V9.0.0, (Dec. 2008), 25 pages.

"$3^{rd}$ Generation Partnership Project; Technical Specification Group Services and System Aspects; Service requirements for machine-type communications; Stage 1 (Release 10)," 3GPP TS 22.368 V1.0.0, (Aug. 2009), 22 pages.

"$3^{rd}$ Generation Partnership Project; Technical Specificaion Group Services and System Aspects; System Improvements for Machine-Type Communications; (Release 10)," 3GPP TR 23.888 V0.2.0, (Jan. 2010), 19 pages.

"$3^{rd}$ Generation Partnership Project; Technical Specificaton Group Services and System Aspects; System Improvements for Machine-Type Communicatoins; (Release 10)," 3GPP TR 23.888 V0.2.1, (Jan. 2010), 19 pages.

International Search Report received in Patent Cooperation Treaty Application No. PCT/CN2011/070853, mailed Apr. 20, 2011, 6 pages.

Written Opnion of the International Searching Authority received in Patent Cooperation Treaty Application No. PCT/CN2011/070853, mailed Apr. 20, 2011, 4 pages.

Office Action issued in Japanese Patent Application No. 2012-552246, dated Nov. 26, 2013, 4 pages (with translation).

\* cited by examiner

US 8,837,326 B2

SESSION MANAGEMENT METHOD AND SYSTEM BASED ON M2M APPLICATION, AND APPARATUS

CROSS-REFERENCE TO RELATED APPLICATION

This application is a continuation of International Application No. PCT/CN2011/070853, filed on Jan. 31, 2011, which claims priority to Chinese Patent Application No. 201010111544.7, filed on Feb. 11, 2010, both of which are hereby incorporated by reference in their entireties.

FIELD OF THE INVENTION

The present invention relates to the field of mobile communication technologies, and in particular, to a session management method and system based on an M2M application, and an apparatus.

BACKGROUND OF THE INVENTION

In an existing communication manner, there are mainly two communication modes, namely, human to human (H2H, Human to Human) and machine to machine (M2M, Machine to Machine). An H2H application mainly refers to communication with humans being communication subjects, such as telephone communication. However, an M2M application is also called a machine type communications (MTC, Machine Type Communications) application, and refers to network communication performed between multiple network elements without involvement of humans, such as traffic control and management, factory equipment monitoring, and remote meter reading.

Furthermore, a network operator or a user within an industry may perform management and control on an M2M group as a whole. For example, in a remote meter reading application in a power industry, all electric meters in a certain region may form a group, a network operator or a power industry user may perform management and control on the group as a whole. In addition, the network operator or the user within the industry may also perform management and control on all M2M user devices having a same M2M application characteristic as a whole. For example, a network operator or a user within an industry may perform management and control on multiple M2M user devices under a same industrial user as a whole (by forming a group). Each M2M terminal device in the group may subscribe to same subscription data, or each M2M terminal device in the group may share one piece of subscription data (group subscription data).

In the human to human communication mode, if subscription data of a user changes, a home subscription database (HLR/HSS) initiates a subscription data modification procedure. According to acquired new subscription data, a mobility management network element (MME/SGSN) may initiate a session management procedure, for example, a bearer modification procedure. For a group formed of M2M user devices, if subscription data changes, subscription data of all user devices in the group may change; or in a scenario where all user devices in a group share group subscription data, when the group subscription data changes, an existing session management procedure is initiated based on user device granularity, however, because the number of user devices in the group is large, a large number of signaling overheads of a network side is caused, which may result in signaling congestion to the network side, and increase a network load.

SUMMARY OF THE INVENTION

Accordingly, embodiments of the present invention provide a session management method and system based on an M2M application and an apparatus, so as to implement rational utilization of a network resource when management is performed on an M2M group, and reduce a network load.

The embodiments of the present invention are implemented as follows.

An embodiment of the present invention provides a session management method based on an M2M application, and the method includes:

acquiring gateway equipment information and group number information of a group user device;

acquiring that group information of the group user device changes;

instructing, according to the gateway equipment information and the group number information of the group user device, a gateway equipment to execute bearer change processing on the group user device; and executing the bearer change processing on the group user device.

An embodiment of the present invention provides a session management method based on an M2M application, and the method includes:

acquiring mobility management network element information and group number information of a group user device;

acquiring that group information of the group user device changes;

instructing, according to the mobility management network element information and the group number information of the group user device, a mobility management network element to execute bearer change processing on the group user device; and executing the bearer change processing on the group user device.

An embodiment of the present invention provides a session management system based on an M2M application, and the system includes: a mobility management network element and a gateway equipment, where the mobility management network element is configured to acquire gateway equipment information and group number information of a group user device; acquire that group information of the group user device changes; instruct, according to the gateway equipment information and the group number information of the group user device, the gateway equipment to execute bearer change processing on the group user device; and execute the bearer change processing on the group user device; and the gateway equipment is configured to acquire mobility management network element information and the group number information of the group user device; acquire that the group information of the group user device changes; instruct, according to the mobility management network element information and the group number information of the group user device, the mobility management network element to execute bearer change processing on the group user device; and execute the bearer change processing on the group user device.

An embodiment of the present invention provides a mobility management network element, including: a first acquiring unit, a second acquiring unit, a first instructing unit and a first executing unit, where the first acquiring unit is configured to acquire gateway equipment information and group number information of a group user device;

the second acquiring unit is configured to acquire that group information of the group user device changes;

the first instructing unit is configured to instruct, according to the gateway equipment information and the group number information of the group user device, a gateway equipment to execute bearer change processing on the group user device; and the first executing unit is configured to execute the bearer change processing on the group user device.

An embodiment of the present invention provides a gateway equipment, including: a third acquiring unit, a fourth acquiring unit, a second instructing unit and a second executing unit, where the third acquiring unit is configured to acquire mobility management network element information and group number information of a group user device;

the fourth acquiring unit is configured to acquire that group information of the group user device changes;

the second instructing unit is configured to instruct, according to the mobility management network element information and the group number information of the group user device, a mobility management network element to execute bearer change processing on the group user device; and the instructing designation unit is configured to execute the bearer change processing on the group user device.

Compared with the prior art, the technical solutions provided by the embodiments of the present invention have the following advantages and features. In the technical solutions provided by the embodiments of the present invention, gateway equipment information and group number information are acquired first, and when shared information of an M2M group changes, the gateway equipment may be instructed, according to the acquired gateway equipment information and group number information and based on group granularity, to execute bearer change processing on the user device, and execute the bearer change processing on the group user device, so as to reduce signaling overheads of a network side, thereby preventing signaling congestion from occurring on the network side and reducing a network load.

BRIEF DESCRIPTION OF THE DRAWINGS

To illustrate the technical solutions in the embodiments of the present invention or in the prior art more clearly, accompanying drawings required for describing the embodiments or the prior art are introduced briefly in the following. Apparently, the accompanying drawings in the following description are merely some embodiments of the present invention, and persons of ordinary skill in the art may further obtain other drawings according to the accompanying drawings without creative efforts.

DETAILED DESCRIPTION OF THE EMBODIMENTS

The technical solutions of the embodiments of the present invention are described clearly and completely below with reference to the accompanying drawings in the embodiments of the present invention. Evidently, the embodiments to be described are only part of rather than all of the embodiments of the present invention. All other embodiments obtained by persons of ordinary skill in the art without creative efforts based on the embodiments of the present invention shall fall within the protection scope of the present invention.

Embodiment 1

Figure 1:
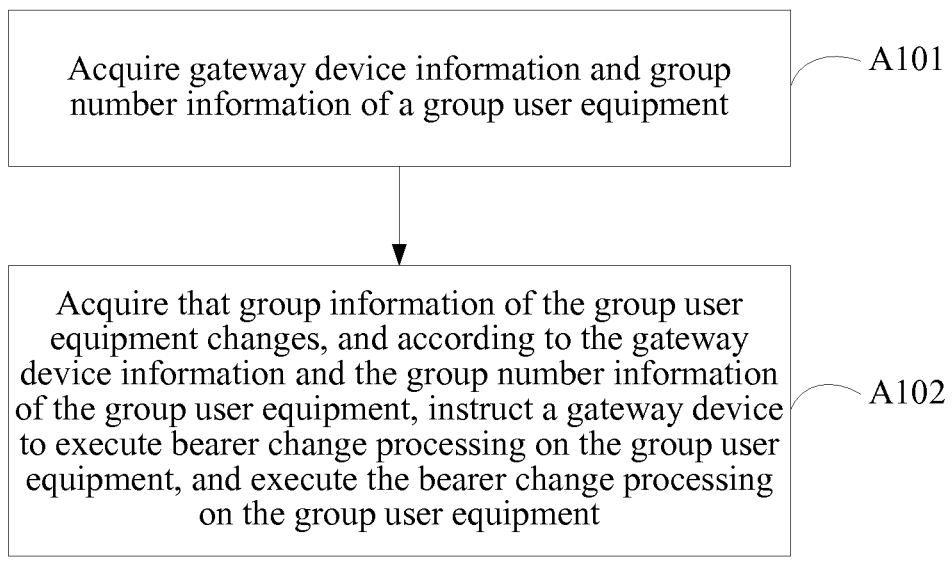
FIG. 1 is a flowchart of a session management method based on an M2M application according to an embodiment of the present invention.

An embodiment of the present invention provides a session management method based on an M2M application, and a procedure in this embodiment, referring to FIG. 1, may include:

A 101: Acquire gateway equipment information and group number information of a group user device.

A specific process for acquiring the gateway equipment information and the group number information may be:

When the group user device initiates an attach procedure or a PDN connection establishment procedure or a PDP context activation procedure, a mobility management network element (MME/SGSN) receives an attach request (Attach Request) or a PDN connectivity request (PDN Connectivity Request) or an activate PDP context request (Activate PDP Context Request) message sent by the group user device.

A group identifier (Group ID) of the group user device is acquired, and may be specifically obtained from a request message sent by the user device, or obtained by the mobility management network element from subscription data, or the group identifier of the group is acquired according to context information of the user device or the group. The group may be a user device group, a machine to machine (Machine To Machine, M2M for short) industrial user (MTC User), an M2M application subscriber (MTC Subscriber or MTC Server), or another group formed of multiple equipments, which is not limited by the embodiment of the present invention.

The mobility management network element sends a session management request message to a gateway equipment (for example, an MME/SGSN sends a Create Session Request message to an SGW, and the SGW sends a Create Session Request message to a PGW or an SGSN sends a Create PDP Context Request message to a GGSN). The message includes mobility management network element information and the group number information of the group user device.

The gateway equipment returns, in a session management response message, the gateway equipment information and the group number information to the mobility management network element, a specific procedure of which may be as follows: The PGW sends a Create Session Response message to the SGW, the SGW then sends a Create Session Response message to the MME/SGSN or the GGSN sends a Create PDP Context Response message to the SGSN. The message includes gateway GPRS support node information and the group number information.

The mobility management network element (MME/SGSN) and the gateway equipment (SGW/PGW/GGSN) may store the mobility management network element information, the gateway equipment information, and the group number information in a bearer context/PDP context of the group user device. Network equipments (including the mobility management network element and the gateway equipment) uniquely identify the group user device through the mobility management network element information, the gateway equipment information, and the group number information. The group user device is attached to a same mobility management network element and a same gateway equipment. Representation forms of the mobility management network element information and the group number information, and the gateway equipment information and the group number information may be as follows.

Manner 1: The mobility management network element information and the group number information may be a mobility management network element identifier+a group identifier, for example, MME ID/SGSN ID+Group ID; the gateway equipment information and the group number information may be a gateway equipment identifier+a group identifier, for example, SGW ID/PGW ID/GGSN ID+Group ID.

A network equipment identifier (including the mobility management network element identifier and the gateway equipment identifier) may be the following manner, but are not limited to the following manner: a globally unique network equipment identifier, for example, a Node ID, where the Node ID may identify a network equipment in a globally unique manner, for example, a mobility management network element identifier (MME ID/SGSN ID) or a gateway equipment identifier (SGW ID/PGW ID/GGSN ID). Alternatively, the network equipment identifier may also be an IP address of a network equipment or a fully qualified domain name (FQDN) of a network equipment. This embodiment does not limit a representation manner of the network equipment identifier. In this embodiment, the network equipment identifier may specifically include the mobility management network element identifier and the gateway equipment identifier.

The group identifier may be an identifier of a group to which a user device belongs (Group ID), and may also be an identifier shared by multiple user devices in a group, such as: an international mobile subscriber identification number (International Mobile Subscriber Identification Number, IMSI for short), a mobile station international integrated services digital network number (Mobile Station International Integrated Services Digital Network Number, MSISDN for short), and an international mobile equipment identity (International Mobile Equipment Identity, IMEI for short); or when a group user device is in an active/standby networking manner, an identifier of an active equipment is, for example: an IMSI, an MSISDN, an IMEI, a packet temporary mobile subscriber identity (Packet Temporary Mobile Subscriber Identity, P-TMSI for short), a globally unique temporary identity (Globally Unique Temporary Identity, GUTI for short) of the active equipment; or other manners may be adopted to indicate an identifier of a group, such as: APN. The embodiment of the present invention does not limit a form of the group identifier.

Manner 2: The mobility management network element information and the group number information may also be a mobility management network element identifier+a resource allocation unit identifier (the resource allocation unit identifier is represented as an identifier allocated by the mobility management network element to the group). The gateway equipment information and the group number information may also be a gateway equipment identifier+a resource allocation unit identifier (the resource allocation unit identifier is represented as an identifier allocated by the gateway equipment to the group). The mobility management network element identifier+the resource allocation unit identifier may be formed of an information element, for example, a mobility management network element resource allocation identifier; and a network equipment identifier+the resource allocation unit identifier may also be formed of an information element, for example, a network equipment resource allocation identifier, which is not limited by this embodiment.

For a representation manner of the network equipment identifier (including the mobility management network element identifier and the gateway equipment identifier), reference may be made to manner 1. The resource allocation unit identifier may uniquely identify, in a network equipment, a user device of the group. For example, the resource allocation unit identifier may be allocated by the network equipment (MME/SGSN/SGW/PGW/GGSN), and may, for example, be allocated according to a group identifier of the user device, so that the network equipment can rapidly locate, by using the resource allocation unit identifier, a context which is of the group user device and corresponds to the network equipment. Specific implementation may include:

A network equipment (MME/SGSN/SGW/PGW/GGSN) may allocate a same network equipment resource allocation identifier to a user device which performs accessing via the network equipment and is in a same group. Specific implementation is as follows: A mobility management network element (MME/SGSN) allocates a same resource allocation unit identifier to a user device which accesses a network via the mobility management network element (attached to the mobility management network element) and is in a same group; similarly, a gateway equipment (SGW/PGW/GGSN) allocates a same resource allocation unit identifier to a user device which accesses a network via the gateway equipment (establishes a PDN connection or a PDP context on the gateway equipment) and is in a same group.

Alternatively, if a user device of a group may establish multiple PDN connections (for example, subscription data includes multiple pieces of PDN subscription context information), a network equipment may also allocate a resource allocation unit identifier to the user device according to PDN connection granularity (APN), which specifically may be that: A network equipment allocates a same resource allocation unit identifier to a user device which performs accessing via the network equipment, establishes PDN connections according to a same APN, and is in a same group. Specific implementation is as follows: A mobility management network element (MME/SGSN) allocates a same resource allocation unit identifier to a user device which accesses a network via the mobility management network element (attached to the mobility management network element), establishes PDN connections according to a same APN, and is in a same group; similarly, a gateway equipment (SGW/PGW/GGSN) allocates a same resource allocation unit identifier to a user device which accesses a network via the gateway equipment, establishes PDN connections according to a same APN (establishes the PDN connections or PDP contexts on the gateway equipment according to the same APN), and is in a same group.

Manner 3: The mobility management network element information and the group number information may also be a mobility management network element resource allocation identifier+a group identifier. The mobility management network element resource allocation identifier may specifically be a mobility management network element identifier+a user resource allocation unit identifier (a resource allocation unit identifier is represented as an identifier allocated by the mobility management network element to the user device). The gateway equipment information and the group number information may be a gateway equipment resource allocation identifier+a group identifier. The mobility management network element resource allocation identifier may specifically be a gateway equipment identifier+a user resource allocation unit identifier (the user resource allocation unit identifier is represented as an identifier allocated by the gateway equipment to the user device).

The network equipment resource allocation identifier (including the mobility management network element identifier and the gateway equipment resource allocation identifier) may identify, in a network equipment (MME/SGSN/SGW/PGW/GGSN), a user device context of the user device. The network equipment resource allocation identifier may be formed of the following, but is not limited to the following: a globally unique network equipment identifier (for example, a Node ID, where the Node ID may identify a network equipment in a globally unique manner, such as MME/SGSN/SGW/PGW/GGSN) and a resource allocation unit identifier (in a network node, a resource allocation unit identifier may be allocated by the network node itself, for example, allocated according to a process number or an interface board number or IMSI information, and the network node can rapidly locate the user device context by using the resource allocation unit identifier). Alternatively, the network equipment resource allocation identifier may also be formed of only a network equipment identifier, for example, a mobility management network element identifier (MME ID/SGSN ID) or a gateway equipment identifier (SGW ID/PGW ID/GGSN ID). This embodiment does not limit a formation manner of the network equipment resource allocation identifier.

A 102: Acquire that group information of the group user device changes, and according to the gateway equipment information and the group number information of the group user device, instruct the gateway equipment to execute bearer change processing on the group user device, and execute the bearer change processing on the group user device.

The acquiring that the group information of the group user device changes may be that the mobility management network element receives an insert subscription data (Insert Subscription Data) message sent by a home subscription database (HLR/HSS), and acquires that subscription data of the group user device is modified; or, the mobility management network element receives a cancel location (Cancel Location) message sent by a home subscription database (HLR/HSS), and acquires that the group user device withdraws; or, the mobility management network element acquires, through change of configuration information (for example, through O&M interference), that the group information of the group user device changes. The bearer change processing may include a bearer modification procedure, or may include a bearer deactivation procedure. The bearer deactivation procedure may further include a separation procedure. In a GERAN/UTRAN system, a bearer may be a PDP context.

According to the gateway equipment information and the group number information of the group user device, the mobility management network element instructs the gateway equipment to execute the bearer change processing on the group user device, and executes the bearer change processing on the group user device. The same mobility management network element information and same serving gateway information and same packet data network gateway information and the same group number information may uniquely indicate the group user device. A specific process may be:

The mobility management network element sends, according to the gateway equipment information and the group number information which are of the group user device and acquired in step A 101, a session management request message to the gateway equipment, to instruct the group user device to execute the bearer change processing, where the message includes the mobility management network element information and the group number information of the group user device (for example, an MME/SGSN sends a Modify Bearer Request/Delete Session Request message to a SGW, where the message sent by the MME/SGSN includes the mobility management network element information and packet data network gateway information and the group number information of the group user device, and the SGW then sends a Modify Bearer Request/Delete Session Request message to a PGW, where the message sent by the SGW includes serving gateway information and the mobility management network element information and the group number information of the group user device, or the SGSN sends an Update PDP Context Request/Delete PDP Context Request message to a GGSN, where the message sent by the SGSN includes the mobility management network element information and the group number information of the group user device), the gateway equipment acquires the mobility management network element information and gateway information and the group number information of the group user device according to the session management request message (for example, the PGW acquires the mobility management network element information, the serving gateway information, the packet data network gateway information, and the group number information of the group user device according to the message sent by the SGW, or the GGSN acquires the mobility management network element information, the gateway GPRS support node information, and the group number information of the group user device according to the message sent by the SGSN), and executes, according to the acquired information, bearer change processing on a context which is of the group user device and on the gateway equipment, where the group user device has the same mobility management network element information and gateway information and group number information.

The gateway equipment returns the session management response message to the mobility management network element (for example, the PGW sends a Modify Bearer Response/Delete Session Response message to the SGW, where the message sent by the PGW includes the packet data network gateway information and the mobility management network element information and the group number information of the group user device, and the SGW then sends a Modify Bearer Response/Delete Session Response message to the MME/SGSN, where the message sent by the SGW includes the serving gateway information and the packet data network gateway information and the group number information of the group user device, or the GGSN sends an Update PDP Context Response/Delete PDP Context Response message to the SGSN, where the message sent by the GGSN includes the gateway GPRS support node information and the group number information of the group user device), and the mobility management network element acquires the mobility management network element information and the gateway information and the group number information of the group user device according to the session management response message (for example, the MME acquires the mobility management network element information, the serving gateway information, the packet data network gateway information, and the group number information of the group user device according to the message sent by the SGW, or the SGSN acquires the mobility management network element information, the gateway GPRS support node information, and the group number information of the group user device according to the message sent by the GGSN), and executes, according to the acquired information, bearer change processing on a context which is of the group user device and on the mobility management network element. The group user device has the same mobility management network element information and gateway information and group number information.

In the embodiment of the present invention, the mobility management network element acquires the gateway equipment information (that is, the mobility management network element acquires information of a gateway equipment serving the group user device) and the group number information of the group user device, and when acquiring that the group information of the group user device changes, may instruct, according to the gateway equipment information and the group number information of the group user device and based on group granularity, the gateway equipment to perform the bearer change processing on the group user device and perform the bearer change processing on the group user device, so as to reduce signaling overheads of a network side, thereby preventing signaling congestion from occurring on the network side and reducing a network load.

Embodiment 2

Figure 2:
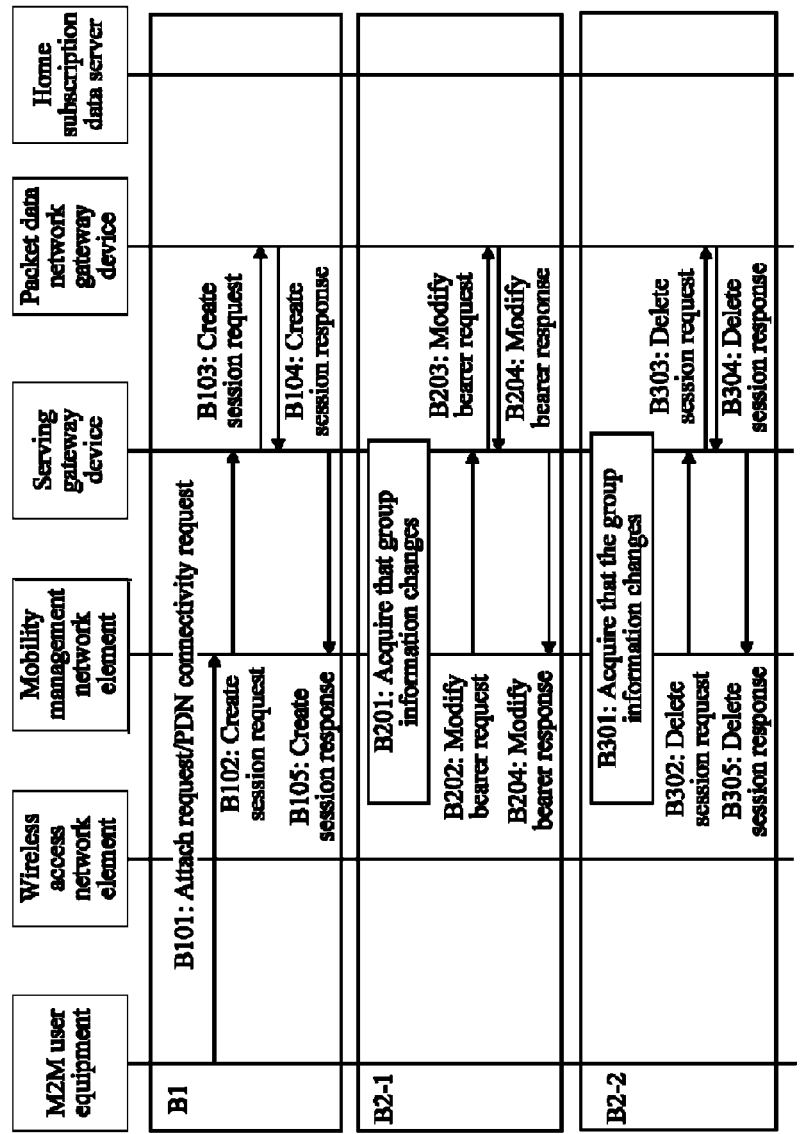
FIG. 2 is a flowchart of a second session management method based on an M2M application according to an embodiment of the present invention.

An embodiment of the present invention provides a session management method based on an M2M application, and a procedure, referring to FIG. 2, may specifically include:

B 1: A mobility management network element acquires gateway equipment information and group number information of a group user device.

In this process, a gateway equipment may also acquire mobility management network element information and the group number information of the group user device. For representation forms of the mobility management network element information and the group number information, and the gateway equipment information and the group number information, reference may be made to the description of step A 101 of Embodiment 1. The mobility management network element acquires the gateway equipment information and the group number information of the group user device, and the gateway equipment acquires the mobility management network element information and the group number information of the group user device, which may be specifically implemented by adopting the following procedure.

B 101: A user device sends an access request message to the mobility management network element. The access request message may be an attach request (Attach Request) or PDN connectivity request (PDN Connectivity Request) message. The embodiment does not limit a name of the access request message.

B 102: The mobility management network element acquires a group identifier of the group user device. The mobility management network element may acquire a group identifier of a group according to the access request message or according to acquired subscription data, or acquire a group identifier of a group according to context information of the user device or the group. The embodiment does not limit how the mobility management network element acquires the group identifier.

The mobility management network element sends a message to a serving gateway to request to create a session. For example, the message may be a create session request (Create Session Request) message. The embodiment does not limit a name of the message. The message includes the mobility management network element information and the group number information of the group user device.

B 103: The serving gateway acquires the mobility management network element information and the group number information of the group user device according to the message sent by the mobility management network element and received in step B 102.

The serving gateway sends a message to a packet data network gateway. For example, the message may be a create session request (Create Session Request) message. The embodiment does not limit a name of the message. The message includes the mobility management network element information, serving gateway information, and the group number information of the group user device.

B 104: The packet data network gateway acquires the mobility management network element information, the serving gateway information, and the group number information of the group user device according to the message sent by the serving gateway and received in step B 103.

The packet data network gateway sends a message to the serving gateway. For example, the message may be a create session response (Create Session Response) message. The embodiment does not limit a name of the message. The message includes packet data network gateway information and the group number information of the group user device.

B 105: The serving gateway acquires the packet data network gateway information and the group number information of the group user device according to the message sent by the packet data network gateway and received in step B 104.

The serving gateway sends a message to the mobility management network element. The message may be a create session response (Create Session Response) message. The embodiment does not limit a name of the message. The message includes the packet data network gateway information, the serving gateway information, and the group number information of the group user device.

B 106: The mobility management network element acquires the packet data network gateway information, the serving gateway information, and the group number information of the group user device according to the message sent by the serving gateway and received in step B 105.

B 2: When acquiring that group information of the group user device changes, according to the gateway equipment information and the group number information of the group user device, the mobility management network element instructs the gateway equipment to execute bearer change processing on the group user device, and executes the bearer change processing on the group user device.

According to the gateway equipment information and the group number information of the group user device, the mobility management network element instructs the gateway equipment to execute the bearer change processing on the group user device, and executes the bearer change processing on the group user device. The bearer change processing may include a bearer modification procedure, or may include a bearer deactivation procedure. A specific procedure may include:

Procedure 1: The mobility management network element acquires that the group information of the group user device changes, instructs the gateway equipment to execute bearer modification on the group user device, and executes the bearer modification on the group user device.

B 201: The mobility management network element (MME/SGSN) receives an insert subscription data (Insert Subscription Data) message sent by a home subscription database (HSS), and acquires that subscription data of the group user device changes; alternatively, the mobility management network element acquires, through change of configuration information (for example, through O&M interference), that the group information of the group user device changes.

B 202: The mobility management network element initiates a bearer modification procedure for the group user device, and modifies a context of the group user device. The same mobility management network element information and serving gateway information and packet data network gateway information and group number information may uniquely indicate the group user device.

The mobility management network element sends a message to the serving gateway. The message may be a modify bearer request (Modify Bearer Request) message. The embodiment does not limit a name of the message. The message includes the mobility management network element information and the packet data network gateway information and the group number information, or may include the mobility management network element information and the serving gateway information and the packet data network gateway information and the group number information, which is not limited by the embodiment.

The mobility management network element sends the message to the serving gateway, which may be that the message is sent to the serving gateway for the group user device having the same mobility management network element information and serving gateway information and packet data network gateway information and group number information, rather than that multiple existing modify bearer request messages are sent based on user device granularity.

B 203: The serving gateway acquires the mobility management network element information and the serving gateway information and the packet data network gateway information and the group number information according to the message sent by the mobility management network element and received in step B 202, which may be specifically implemented through the following.

If the received message only includes the mobility management network element information and the packet data network gateway information and the group number information, the serving gateway may acquire the mobility management network element information and the packet data network gateway information and the group number information from the message. In addition, the serving gateway may further match, according to the acquired mobility management network element information and packet data network gateway information and group number information, mobility management network element information and packet data network gateway information and group number information that are in contexts of all user devices performing accessing via the serving gateway. If the matching is successful, the serving gateway may acquire its own information (the serving gateway information) according to user device context information.

Alternatively, if the received message includes the mobility management network element information and the serving gateway information and the packet data network gateway information and the group number information, the serving gateway may acquire the mobility management network element information and the serving gateway information and the packet data network gateway information and the group number information from the message.

The serving gateway sends a message to the packet data network gateway. The message may be a modify bearer request (Modify Bearer Request) message. The embodiment does not limit a name of the message. The serving gateway may acquire, according to the packet data network gateway information acquired in the foregoing step, the packet data network gateway to which the group user device is attached. The message sent by the serving gateway may include the mobility management network element information and the serving gateway information and the group number information, or may include the mobility management network element information and the serving gateway information and the packet data network gateway information and the group number information, which is not limited by the embodiment.

B 204: The packet data network gateway acquires the mobility management network element information and the serving gateway information and the packet data network gateway information and the group number information according to the message sent by the serving gateway and received in step B 203, which may be specifically implemented through the following.

If the received message only includes the mobility management network element information and the serving gateway information and the group number information, the packet data network gateway may acquire the mobility management network element information and the serving gateway information and the group number information from the message. In addition, the packet data network gateway may further match, according to the acquired mobility management network element information and serving gateway information and group number information, mobility management network element information and serving gateway information and group number information that are in contexts of all user devices performing accessing via the packet data network gateway. If the matching is successful, the packet data network gateway may acquire its own information (the packet data network gateway information) according to the user device context information.

Alternatively, if the received message includes the mobility management network element information and the serving gateway information and the packet data network gateway information and the group number information, the packet data network gateway may acquire the mobility management network element information and the serving gateway information and the packet data network gateway information and the group number information from the message.

The packet data network gateway updates, according to the acquired information, context information of the group user device performing accessing via the packet data network gateway. A specific method may be: The packet data network gateway updates a group user device context which has (stores) the mobility management network element information and the serving gateway information and the packet data network gateway information and the group number information or the mobility management network element information and the serving gateway information and the group number information that are acquired by the packet data network gateway according to the message sent by the serving gateway and received in step B 203.

The packet data network gateway sends a message to the serving gateway to acknowledge that the update is completed. The message may be a modify bearer response (Modify Bearer Response) message. The embodiment does not limit a name of the message. The message sent by the packet data serving gateway may include the mobility management network element information and the packet data network gateway information and the group number information, or may include the mobility management network element information and the serving gateway information and the packet data network gateway information and the group number information, which is not limited by the embodiment.

B 205: The serving gateway acquires the mobility management network element information and the serving gateway information and the packet data network gateway information and the group number information according to the message sent by the packet data serving gateway and received in step B 204, which may be specifically implemented through the following.

If the received message includes the mobility management network element information and the packet data network gateway information and the group number information, the serving gateway may acquire the mobility management network element information and the packet data network gateway information and the group number information from the message. In addition, the serving gateway may match, according to the acquired mobility management network element information and packet data network gateway information and group number information, the mobility management network element information and the packet data network gateway information and the group number information that are in the contexts of all user devices performing accessing via the serving gateway. If the matching is successful, the serving gateway may acquire its own information (the serving gateway information) according to the user device context information.

Alternatively, if the received message includes the mobility management network element information and the serving gateway information and the packet data network gateway information and the group number information, the serving gateway may acquire the mobility management network element information and the serving gateway information and the packet data network gateway information and the group number information from the message.

The serving gateway updates, according to the acquired information, the context information of the group user device performing accessing via the serving gateway. A specific method may be: The serving gateway updates the group user device context which has (stores) the mobility management network element information and the serving gateway information and the packet data network gateway information and the group number information or the mobility management network element information and the packet data network gateway information and the group number information that are acquired by the serving gateway according to the message sent by the packet data serving gateway and received in step B 204.

The serving gateway sends a message to the mobility management network element to acknowledge that the update is completed. The message may be a modify bearer response (Modify Bearer Response) message. The embodiment does not limit a name of the message. The message sent by the serving gateway may include the serving gateway information and the packet data network gateway information and the group number information, or may include the mobility management network element information and the serving gateway information and the packet data network gateway information and the group number information, which is not limited by the embodiment.

B 206: The mobility management network element acquires the mobility management network element information and the serving gateway information and the packet data network gateway information and the group number information according to the message sent by the serving gateway and received in step B 205, which may be specifically implemented through the following.

If the received message only includes the serving gateway information and the packet data network gateway information and the group number information, the mobility management network element may acquire the serving gateway information and the packet data network gateway information and the group number information from the message. In addition, the mobility management network element may further match, according to the acquired serving gateway information and packet data network gateway information and group number information, serving gateway information and packet data network gateway information and group number information that are in contexts of all user devices performing accessing via the mobility management network element. If the matching is successful, the mobility management network element may acquire its own information (the mobility management network element information) according to the user device context information.

Alternatively, if the received message includes the mobility management network element information and the serving gateway information and the packet data network gateway information and the group number information, the mobility management network element may acquire the mobility management network element information and the serving gateway information and the packet data network gateway information and the group number information from the message.

The mobility management network element updates, according to the acquired information, the context information of the group user device performing accessing via the mobility management network element. A specific method may be: The mobility management network element updates the group user device context which has (stores) the mobility management network element information and the serving gateway information and the packet data network gateway information and the group number information or the serving gateway information and the packet data network gateway information and the group number information that are acquired by the mobility management network element according to the message sent by the serving gateway and received in step B 205.

Procedure 2: The mobility management network element acquires that the group information of the group user device changes, instructs the gateway equipment to execute bearer deactivation on the group user device, and executes the bearer deactivation on the group user device.

B301: The mobility management network element (MME/SGSN) receives an insert subscription data (Insert Subscription Data) message sent by a home subscription database (HSS), and acquires that subscription data of the group user device changes (for example, an APN in original subscription data is unavailable in updated subscription data); acquires that the mobility management network element receives a cancel location (Cancel Location) message sent by a home subscription data server (HSS) and the message indicates that the group user device withdraws (withdraw); or, the mobility management network element acquires, through change of configuration information (for example, through O&M interference), that the group information of the group user device changes; or, the mobility management network element needs to deactivate a bearer context of the group user device when acquiring that its own resource is insufficient.

B 302: The mobility management network element initiates a bearer deactivation procedure for the group user device, and deactivates the bearer context of the group user device. The same mobility management network element information and serving gateway information and packet data network gateway information and group number information may uniquely indicate the group user device. The bearer deactivation procedure may further include a separation procedure.

The mobility management network element may send a message to the serving gateway. The message may be a delete session request (Delete Session Request) message. The embodiment does not limit a name of the message. The message includes the mobility management network element information and the packet data network gateway information and the group number information, or may include the mobility management network element information and the serving gateway information and the packet data network gateway information and the group number information, which is not limited by the embodiment.

The mobility management network element sends the message to the serving gateway, which may be that the message is sent to the serving gateway for the group user device having the same mobility management network element information and serving gateway information and packet data network gateway information and group number information, rather than that multiple existing delete session request messages are sent based on user device granularity.

B 303: The serving gateway acquires the mobility management network element information and the serving gateway information and the packet data network gateway information and the group number information according to the message sent by the mobility management network element and received in step B 302, and for details, reference may be made to the implementation of step B 203.

The serving gateway may send a message to the packet data network gateway. The message may be a delete session request (Delete Session Request) message. The embodiment does not limit a name of the message. The message sent by the serving gateway may include the mobility management network element information and the serving gateway information and the group number information, or may include the mobility management network element information and the serving gateway information and the packet data network gateway information and the group number information, which is not limited by the embodiment.

B 304: The packet data network gateway acquires the mobility management network element information and the serving gateway information and the packet data network gateway information and the group number information according to the message sent by the serving gateway and received in step B 303, and for details, reference may be made to the implementation of step B 204.

The packet data network gateway deletes, according to the foregoing information, the context information of the group user device performing accessing via the packet data network gateway. A specific method may be: The packet data network gateway deletes the group user device context which has (stores) the mobility management network element information and the serving gateway information and the packet data network gateway information and the group number information or the mobility management network element information and the serving gateway information and the group number information that are acquired by the packet data network gateway according to the message sent by the serving gateway and received in step B 303.

The packet data network gateway may send a message to the serving gateway to acknowledge that the deactivation is completed. The message may be a delete session response (Delete Session Response) message. The embodiment does not limit a name of the message. The message sent by the packet data network gateway may include the mobility management network element information and the packet data network gateway information and the group number information, or may include the mobility management network element information and the serving gateway information and the packet data network gateway information and the group number information, which is not limited by the embodiment.

B 305: The serving gateway acquires the mobility management network element information and the serving gateway information and the packet data network gateway information and the group number information according to the message sent by the packet data network gateway and received in step B 304, and for details, reference may be made to the implementation of step B 205.

The serving gateway deletes, according to the acquired information, the context information of the group user device performing accessing via the serving gateway. A specific method may be: The serving gateway deletes the group user device context which has (stores) the mobility management network element information and the serving gateway information and the packet data network gateway information and the group number information or the mobility management network element information and the packet data network gateway information and the group number information that are acquired by the serving gateway according to the message sent by the packet data network gateway and received in step B 304.

The serving gateway may send a message to the mobility management network element to acknowledge that the deactivation is completed. The message may be a delete session Response (Delete Session Response) message. The embodiment does not limit a name of the message. The message sent by the serving gateway may include the serving gateway information and the packet data network gateway information and the group number information, or may include the mobility management network element information and the serving gateway information and the packet data network gateway information and the group number information, which is not limited by the embodiment.

B 306: The mobility management network element acquires the mobility management network element information and the serving gateway information and the packet data network gateway information and the group number information according to the message sent by the serving gateway and received in step B 305, and for details, reference may be made to the implementation of step B 206.

The mobility management network element deletes, according to the acquired information, the context information of the group user device performing accessing via the mobility management network element. A specific method may be: The mobility management network element deletes the group user device context which has (stores) the mobility management network element information and the serving gateway information and the packet data network gateway information and the group number information or the serving gateway information and the packet data network gateway information and the group number information that are acquired by the mobility management network element according to the message sent by the serving gateway and received in step B 305.

Embodiment 3

Figure 3:
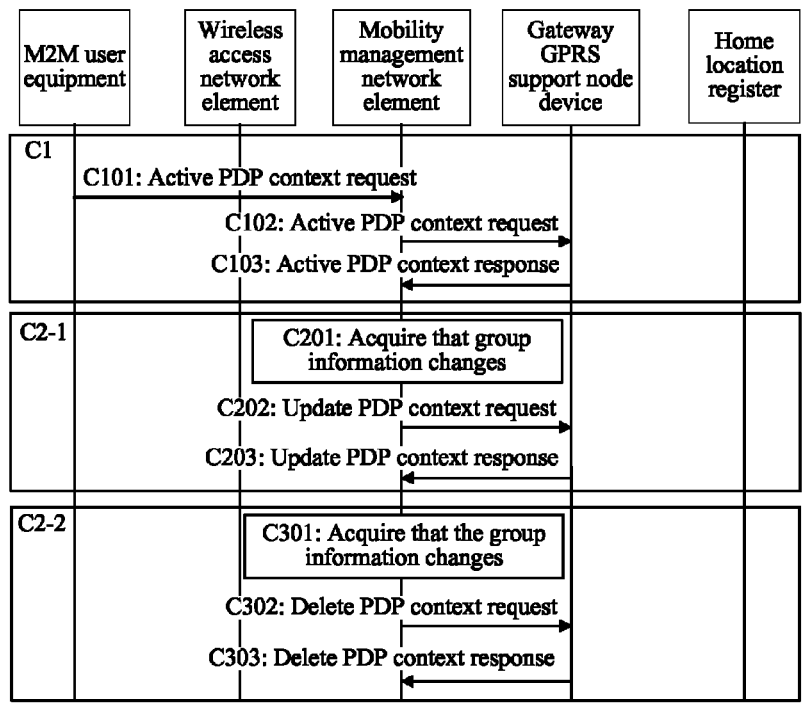
FIG. 3 is a flowchart of a third session management method based on an M2M application according to an embodiment of the present invention.

An embodiment of the present invention provides a session management method based on an M2M application, and a procedure, referring to FIG. 3, may specifically include:

C 1: A mobility management network element acquires gateway equipment information and group number information of a group user device.

In this process, a gateway equipment may also acquire mobility management network element information and the group number information of the group user device. For representation forms of the mobility management network element information and the group number information, and the gateway equipment information and the group number information, reference may be made to the description of step A 101 of Embodiment 1. The mobility management network element acquires the gateway equipment information and the group number information of the group user device, and the gateway equipment acquires the mobility management network element information and the group number information of the group user device, which may be specifically implemented by adopting the following procedure.

C 101: A user device sends an access request message to the mobility management network element. The access request message may be an active PDP context request (Active PDP Context Request) message. The embodiment does not limit a name of the access request message.

C 102: The mobility management network element acquires a group identifier of the group user device. The mobility management network element may acquire a group identifier of a group according to the access request message or according to acquired subscription data, or acquire a group identifier of a group according to context information of the user device or the group. The embodiment does not limit how the mobility management network element acquires the group identifier.

The mobility management network element sends a message to a gateway GPRS support node to request to activate a PDP context. For example, the message may be an active PDP context request (Active PDP Context Request) message. The embodiment does not limit a name of the message. The message includes the mobility management network element information and the group number information of the group user device.

C 103: The gateway GPRS support node acquires the mobility management network element information and the group number information of the group user device according to the message sent by the mobility management network element and received in step C 102.

The gateway GPRS support node sends a message to the mobility management network element to acknowledge the activation of the PDP context. For example, the message may be an active PDP context response (Active PDP Context Response) message. The embodiment does not limit a name of the message. The message includes gateway GPRS support node identification information and the group number information of the group user device.

C 2: When acquiring that group information of the group user device changes, according to the gateway equipment information and the group number information of the group user device, the mobility management network element instructs the gateway equipment to execute PDP context change processing on the group user device, and executes the PDP context change processing on the group user device.

According to the gateway equipment information and the group number information of the group user device, the mobility management network element instructs the gateway equipment to execute the PDP context change processing on the group user device, and executes the PDP context change processing on the group user device. The PDP context change processing may include a PDP context modification procedure, or may include a PDP context deactivation procedure. A specific procedure may include:

Procedure 1: The mobility management network element acquires that the group information of the group user device changes, instructs the gateway equipment to execute PDP context modification on the group user device, and executes the PDP context modification on the group user device.

C 201: The mobility management network element (SGSN) receives an insert subscription data (Insert Subscription Data) message sent by a home subscription database (HLR), and acquires that subscription data of the group user device changes; alternatively, the mobility management network element acquires, through change of configuration information (for example, through O&M interference), that the group information of the group user device changes.

C 202: The mobility management network element initiates a PDP context modification procedure for the group user device, and modifies the PDP context of the group user device. The same mobility management network element information and gateway GPRS support node information and group number information may uniquely indicate the group user device.

The mobility management network element sends a message to the gateway GPRS support node to request to update the PDP context. The message may be an update PDP context request (Update PDP Context Request) message. The embodiment does not limit a name of the message. The message may include the mobility management network element information and the group number information, or may include the mobility management network element information and the gateway GPRS support node information and the group number information, which is not limited by the embodiment.

The mobility management network element sends the message to the gateway GPRS support node, which may be that the message is sent to the gateway GPRS support node for the group user device having the same mobility management network element information and gateway GPRS support node information and group number information, rather than that multiple existing update PDP context request messages are sent based on user device granularity.

C 203: The gateway GPRS support node acquires the mobility management network element information and the gateway GPRS support node information and the group number information according to the message sent by the mobility management network element and received in step C 202, which may be specifically implemented through the following.

If the received message only includes the mobility management network element information and the group number information, the gateway GPRS support node may acquire the mobility management network element information and the group number information from the message. In addition, the gateway GPRS support node may further match, according to the mobility management network element information and the group number information, mobility management network element information and group number information that are in contexts of all user devices performing accessing via the gateway GPRS support node. If the matching is successful, the gateway GPRS support node may acquire its own information (the gateway GPRS support node information) according to user device context information.

Alternatively, if the received message includes the mobility management network element information and the gateway GPRS support node information and the group number information, the gateway GPRS support node may acquire the mobility management network element information and the gateway GPRS support node information and the group number information from the message.

The gateway GPRS support node updates, according to the acquired information, the PDP context information of the group user device performing accessing via the gateway GPRS support node. A specific method may be: The gateway GPRS support node updates a group user device PDP context which has (stores) the mobility management network element information and the group number information or the mobility management network element information and the gateway GPRS support node information and the group number information that are acquired by the gateway GPRS support node according to the message sent by the mobility management network element and received in step C 202.

The gateway GPRS support node sends a message to the mobility management network element to acknowledge that the update of the PDP context is completed. The message may be an update PDP context response (Update PDP Context Response) message. The embodiment does not limit a name of the message. The message sent by the gateway GPRS support node may include the gateway GPRS support node information and the group number information, or may include the mobility management network element information and the gateway GPRS support node information and the group number information, which is not limited by the embodiment.

C 204: The mobility management network element acquires the mobility management network element information and the gateway GPRS support node information and the group number information according to the message sent by the gateway GPRS support node and received in step C 203, which may be specifically implemented through the following.

If the received message only includes the gateway GPRS support node information and the group number information, the mobility management network element may acquire the gateway GPRS support node information and the group number information from the message. In addition, the mobility management network element may match, according to the acquired gateway GPRS support node information and group number information, gateway GPRS support node information and group number information that are in contexts of all user devices performing accessing via the mobility management network element. If the matching is successful, the mobility management network element may acquire its own information (the mobility management network element information) according to the user device context information.

Alternatively, if the received message includes the mobility management network element information and the gateway GPRS support node information and the group number information, the mobility management network element may acquire the mobility management network element information and the gateway GPRS support node information and the group number information from the message.

The mobility management network element updates, according to the acquired information, the PDP context information of the group user device performing accessing via the mobility management network element. A specific method may be: The mobility management network element updates the group user device PDP context which has (stores) the gateway GPRS support node information and the group number information or the mobility management network element information and the gateway GPRS support node information and the group number information that are acquired by the mobility management network element according to the message sent by the gateway GPRS support node and received in step C 203.

Procedure 2: The mobility management network element acquires that the group information of the group user device changes, instructs the gateway equipment to execute PDP context deactivation on the group user device, and executes the PDP context deactivation on the group user device.

C 301: The mobility management network element (SGSN) receives an insert subscription data (Insert Subscription Data) message sent by a home subscription database (HLR), and acquires that group subscription data of the group user device changes (for example, an APN in original subscription data is unavailable in updated subscription data); or, the mobility management network element acquires, through change of configuration information (for example, through O&M interference), that the group information of the group user device changes; or, the mobility management network element needs to deactivate the PDP context of the group user device when acquiring that its own resource is insufficient.

C 302: The mobility management network element initiates a PDP context deactivation procedure for the group user device, and deactivates the context of the group user device. The same mobility management network element information and gateway GPRS support node information and group number information may uniquely indicate the group user device. The PDP context deactivation procedure may further include a separation procedure.

The mobility management network element sends a message to the gateway GPRS support node to request to delete the PDP context. The message may be a delete PDP context request (Delete PDP Context Request) message. The embodiment does not limit a name of the message. The message may include the mobility management network element information and the group number information, or may include the mobility management network element information and the gateway GPRS support node information and the group number information, which is not limited by the embodiment.

The mobility management network element sends the message to the gateway GPRS support node, which may be that the message is sent to the gateway GPRS support node for the group user device having the same mobility management network element information and gateway GPRS support node information and group number information, rather than that multiple existing update PDP context deactivate messages are sent based on user device granularity.

C 303: The gateway GPRS support node acquires the mobility management network element information and the gateway GPRS support node information and the group number information according to the message sent by the mobility management network element and received in step C 302, and for details, reference may be made to the implementation of step C 203.

The gateway GPRS support node deactivates, according to the foregoing information, the PDP context of the group user device performing accessing via the gateway GPRS support node. A specific method may be: The gateway GPRS support node deletes the group user device PDP context which has (stores) the mobility management network element information and the group number information or the mobility management network element information and the gateway GPRS support node information and the group number information that are acquired by the gateway GPRS support node according to the message sent by the mobility management network element and received in step C 302.

The gateway GPRS support node may send a message to the mobility management network element to acknowledge that the deactivation of the PDP context is completed. The message may be a delete PDP context response (Delete PDP Context Response) message. The embodiment does not limit a name of the message. The message sent by the gateway GPRS support node may include the gateway GPRS support node information and the group number information, or may include the mobility management network element information and the gateway GPRS support node information and the group number information, which is not limited by the embodiment.

C 304: The mobility management network element acquires the mobility management network element information and the gateway GPRS support node information and the group number information according to the message sent by the gateway GPRS support node and received in step C 303, and for details, reference may be made to step C 204.

The mobility management network element deactivates, according to the acquired information, the PDP context of the group user device performing accessing via the mobility management network element. A specific method may be: The mobility management network element deletes the user device PDP context which has (stores) the gateway GPRS support node information and the group number information or the mobility management network element information and the gateway GPRS support node information and the group number information that are acquired by the mobility management network element according to the message sent by the gateway GPRS support node and received in step C 303.

Embodiment 4

Figure 4:
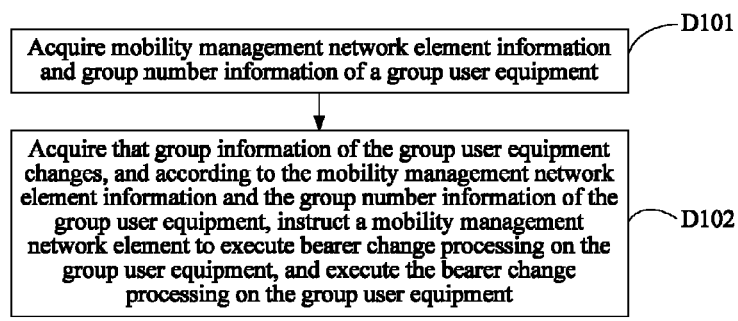
FIG. 4 is a flowchart of a fourth session management method based on an M2M application according to an embodiment of the present invention.

An embodiment of the present invention provides a session management method based on an M2M application, and a procedure in this embodiment, referring to FIG. 4, may include:

D 101: Acquire mobility management network element information and group number information of a group user device.

For a specific process of acquiring the mobility management network element information and the group number information of the group user device, reference may be made to the description of step A 101.

A mobility management network element (MME/SGSN) and a gateway equipment (SGW/PGW/GGSN) may store the mobility management network element information, gateway equipment information, and the group number information in a bearer context/PDP context of a group user device. Network equipments (including the mobility management network element and the gateway equipment) uniquely identify the group user device through the mobility management network element information, the gateway equipment information, and the group number information. The group user device is attached to a same mobility management network element and a same gateway equipment.

For representation forms of the mobility management network element information and the group number information, and the gateway equipment information and the group number information, reference may be made to the description of step A 101.

D 102: Acquire that group information of the group user device changes, and according to the mobility management network element information and the group number information of the group user device, instruct the mobility management network element to execute bearer change processing on the group user device, and execute the bearer change processing on the group user device.

The acquiring that the group information of the group user device changes may be that the gateway equipment (for example, a packet data network gateway or a gateway GRPS support node) receives a PCC message (for example, a Policy and Charging Rules Response message) sent by a policy and charging rules function entity (PCRF), and acquires that a group PCC rule changes; or, the gateway equipment (for example, the packet data network gateway) receives a message sent by the mobility management network element (for example, the mobility management network element sends a Modify Bearer Command message to the serving gateway, and the serving gateway then sends a Modify Bearer Command message to the packet data network gateway), and acquires that group user device QoS changes; or the gateway equipment (for example, the packet data network gateway or the gateway GRPS support node) acquires, through change of configuration information (for example, through O&M interference), that the group information changes. The bearer change processing may include a bearer modification procedure, or may include a bearer deactivation procedure. The bearer deactivation procedure may further include a separation procedure. In a GERAN/UTRAN system, a bearer may be a PDP context.

The gateway equipment instructs, according to mobility management network element information and the group number information of the group user device, the mobility management network element to execute the bearer change processing on the group user device, and executes the bearer change processing on the group user device. The same mobility management network element information and serving gateway information and packet data network gateway information and group number information may uniquely indicate the group user device. A specific process may be:

The gateway equipment sends a session management request message to the mobility management network element according to the gateway equipment information and the group number information which are of the group user device and acquired in step D 101 (for example, a PGW sends an Update Bearer Request/Delete bearer Request message to an SGW, where the message sent by the PGW includes the packet data network gateway information and the mobility management network element information and the group number information of the group user device, and the SGW then sends an Update Bearer Request/Delete bearer Request message to an MME/SGSN, where the message sent by the SGW includes the serving gateway information and the packet data network gateway information and the group number information of the group user device, or a GGSN sends an Update PDP Context Request/Delete PDP Context Request message to an SGSN, where the message sent by the GGSN includes the gateway GPRS support node information and the group number information of the group user device), so as to instruct the mobility management network element to execute the bearer change processing. The mobility management network element acquires the mobility management network element information and the gateway information and the group number information of the group user device according to the session management request message (for example, the MME acquires the mobility management network element information and the serving gateway information and the packet data network gateway information and the group number information of the group user device according to the message sent by the SGW, or the SGSN acquires the mobility management network element information, and the gateway GPRS support node information and the group number information of the group user device according to the message sent by the GGSN), and executes, according to the acquired information, bearer change processing on a context which is of the group user device and on the mobility management network element. The group user device has the same mobility management network element information and gateway information and group number information.

The mobility management network element returns a session management message to the gateway equipment (for example, the MME/SGSN sends an Update Bearer Response/Delete bearer Response message to the SGW, where the message sent by the MME/SGSN includes the mobility management network element information and the packet data network gateway information and the group number information of the group user device, and the SGW then sends an Update Bearer Response/Delete bearer Response message to the PGW, where the message sent by the SGW includes the serving gateway information and the mobility management network element information and the group number information of the group user device, or the SGSN sends an Update PDP Context Response/Delete PDP Context Response message to the GGSN, where the message sent by the SGSN includes the mobility management network element information and the group number information of the group user device). The gateway equipment acquires the mobility management network element information and the gateway information and the group number information of the group user device according to the session management request message (for example, the PGW acquires the mobility management network element information, the serving gateway information, the packet data network gateway information and the group number information of the group user device according to the message sent by the SGW, or the GGSN acquires the mobility management network element information, the gateway GPRS support node information and the group number information of the group user device according to the message sent by the SGSN), and executes, according to the acquired information, bearer change processing on a context which is of the group user device and on the gateway equipment. The group user device has the same mobility management network element information and gateway information and group number information.

In the embodiment of the present invention, the gateway equipment acquires the mobility management network element information (that is, the gateway equipment acquires information of a mobility management network element serving the group user device) and the group number information of the group user device, and when acquiring that the group information of the group user device changes, may instruct, according to the mobility management network element information and the group number information of the group user device and based on group granularity, the mobility management network element to perform the bearer change processing on the group user device and perform the bearer change processing on the group user device, so as to reduce signaling overheads of a network side, thereby preventing signaling congestion from occurring on the network side and reducing a network load.

Embodiment 5

Figure 5:
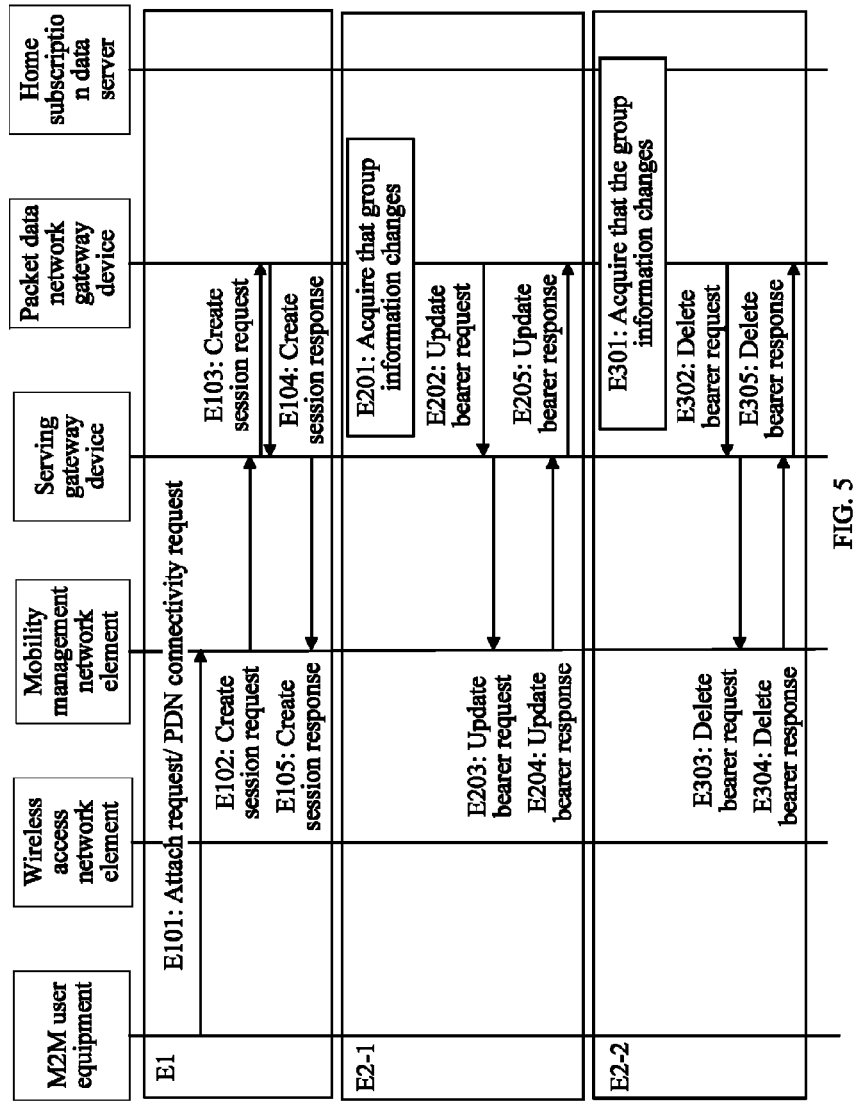
FIG. 5 is a flowchart of a fifth session management method based on an M2M application according to an embodiment of the present invention.

An embodiment of the present invention provides a session management method based on an M2M application, and a procedure, referring to FIG. 5, may specifically include:

E 1: A gateway equipment acquires mobility management network element information and group number information of a group user device.

In this process, a mobility management network element may also acquire gateway equipment information and the group number information of the group user device. For representation forms of the mobility management network element information and the group number information, and the gateway equipment information and the group number information, reference may be made to the description of step A 101 of Embodiment 1. The mobility management network element acquires the gateway equipment information and the group number information of the group user device, and the gateway equipment acquires the mobility management network element information and the group number information of the group user device, and for details, reference may be made to the implementation of step B 1 of Embodiment 2.

E 2: When acquiring that group information of the group user device changes, a network equipment instructs, according to the mobility management network element information and the group number information of the group user device, the mobility management network element to execute bearer change processing on the group user device, and executes the bearer change processing on the group user device.

According to the gateway equipment information and the group number information of the group user device, the network equipment instructs the mobility management network element to execute the bearer change processing on the group user device, and executes the bearer change processing on the group user device. The bearer change processing may include a bearer modification procedure, or may include a bearer deactivation procedure. A specific procedure may include:

Procedure 1: The gateway equipment acquires that the group information of the group user device changes, instructs the mobility management network element to execute bearer modification on the group user device, and executes the bearer modification on the group user device.

E 201: The gateway equipment (PGW) receives a PCC message (for example, a Policy and Charging Rules Response message) sent by a policy and charging rules function entity (PCRF), and acquires that a PCC rule of the group user device changes; or, the gateway equipment (for example, a packet data network gateway) receives a message sent by the mobility management network element (for example, the mobility management network element sends a Modify Bearer Command message to a serving gateway, and the serving gateway then sends a Modify Bearer Command message to the packet data network gateway), and acquires that information of the group user device changes (for example, group QoS information changes); or, the gateway equipment (for example, the packet data network gateway or a gateway GRPS support node) acquires, through change of configuration information (for example, through O&M interference), that the group information of the group user device changes.

E 202: The packet data network gateway initiates a bearer modification procedure for the group user device, and modifies a context of the group user device. The same mobility management network element information and same serving gateway information and same packet data network gateway information and the same group number information may uniquely indicate the group user device.

The packet data network gateway sends a message to the serving gateway. The message may be an update bearer request (Update Bearer Request) message. The embodiment does not limit a name of the message. The message includes the mobility management network element information and the packet data network gateway information and the group number information, or may include the mobility management network element information and the serving gateway information and the packet data network gateway information and the group number information, which is not limited by the embodiment.

The packet data network gateway sends the message to the serving gateway, which may be that the message is sent to the serving gateway for the group user device having the same mobility management network element information and serving gateway information and packet data network gateway information and group number information, rather than that multiple existing modify bearer request messages are sent based on user device granularity.

E 203: The serving gateway acquires the mobility management network element information and the serving gateway information and the packet data network gateway information and the group number information according to the message sent by a packet data serving gateway and received in step E 204, which may be specifically implemented through the following.

If the received message includes the mobility management network element information and the packet data network gateway information and the group number information, the serving gateway may acquire the mobility management network element information and the packet data network gateway information and the group number information from the message. In addition, the serving gateway may match, according to the acquired mobility management network element information and packet data network gateway information and group number information, mobility management network element information and packet data network gateway information and group number information that are in contexts of all user devices performing accessing via the serving gateway. If the matching is successful, the serving gateway may acquire its own information (the serving gateway information) according to user device context information.

Alternatively, if the received message includes the mobility management network element information and the serving gateway information and the packet data network gateway information and the group number information, the serving gateway may acquire the mobility management network element information and the serving gateway information and the packet data network gateway information and the group number information from the message.

The serving gateway may send a message to the mobility management network element. The message may be an update bearer request (Update Bearer Request) message. The embodiment does not limit a name of the message. The message sent by the serving gateway may include the packet data network gateway information and the serving gateway information and the group number information, or may include the mobility management network element information and the serving gateway information and the packet data network gateway information and the group number information, which is not limited by the embodiment.

E 204: The mobility management network element acquires the mobility management network element information and the serving gateway information and the packet data network gateway information and the group number information according to the message sent by the serving gateway and received in step E 203, which may be specifically implemented through the following.

If the received message only includes the serving gateway information and the packet data network gateway information and the group number information, the mobility management network element may acquire the serving gateway information and the packet data network gateway information and the group number information from the message. In addition, the mobility management network element may further match, according to the acquired serving gateway information and packet data network gateway information and group number information, serving gateway information and packet data network gateway information and group number information that are in contexts of all user devices performing accessing via the mobility management network element. If the matching is successful, the mobility management network element may acquire its own information (the mobility management network element information) according to the user device context information.

Alternatively, if the received message includes the mobility management network element information and the serving gateway information and the packet data network gateway information and the group number information, the mobility management network element may acquire the mobility management network element information and the serving gateway information and the packet data network gateway information and the group number information from the message.

The mobility management network element updates, according to the acquired information, context information of the group user device performing accessing via the mobility management network element. A specific method may be: The mobility management network element updates a group user device context which has (stores) the mobility management network element information and the serving gateway information and the packet data network gateway information and the group number information or the serving gateway information and the packet data network gateway information and the group number information that are acquired by the mobility management network element according to the message sent by the serving gateway and received in step E 203.

The mobility management network element may send a message to the serving gateway to confirm that the update of a bearer is completed. The message may be an update bearer response (Update Bearer Response) message. The embodiment does not limit a name of the message. The message includes the mobility management network element information and the packet data network gateway information and the group number information, or may include the mobility management network element information and the serving gateway information and the packet data network gateway information and the group number information, which is not limited by the embodiment.

E 205: The serving gateway acquires the mobility management network element information and the serving gateway information and the packet data network gateway information and the group number information according to the message sent by the mobility management network element and received in step E 204, which may be specifically implemented through the following.

If the received message only includes the mobility management network element information and the packet data network gateway information and the group number information, the serving gateway may acquire the mobility management network element information and the packet data network gateway information and the group number information from the message. In addition, the serving gateway may further match, according to the acquired mobility management network element information and packet data network gateway information and group number information, the mobility management network element information and the packet data network gateway information and the group number information that are in the contexts of all user devices performing accessing via the serving gateway. If the matching is successful, the serving gateway may acquire its own information (the serving gateway information) according to the user device context information.

Alternatively, if the received message includes the mobility management network element information and the serving gateway information and the packet data network gateway information and the group number information, the serving gateway may acquire the mobility management network element information and the serving gateway information and the packet data network gateway information and the group number information from the message.

The serving gateway updates, according to the acquired information, the context information of the group user device performing accessing via the serving gateway. A specific method may be: The serving gateway updates the group user device context which has (stores) the mobility management network element information and the serving gateway information and the packet data network gateway information and the group number information or the mobility management network element information and the packet data network gateway information and the group number information that are acquired by the serving gateway according to the message sent by the packet data serving gateway and received in step E 204.

The serving gateway sends a message to the packet data network gateway to acknowledge that the update of the bearer is completed. The message may be an update bearer response (Update Bearer Response) message. The embodiment does not limit a name of the message. The message sent by the serving gateway may include the serving gateway information and the mobility management network element information and the group number information, or may include the mobility management network element information and the serving gateway information and the packet data network gateway information and the group number information, which is not limited by the embodiment.

E 206: The packet data network gateway acquires the mobility management network element information and the serving gateway information and the packet data network gateway information and the group number information according to the message sent by the serving gateway and received in step E 205, which may be specifically implemented through the following.

If the received message only includes the mobility management network element information and the serving gateway information and the group number information, the packet data network gateway may acquire the mobility management network element information and the serving gateway information and the group number information from the message. In addition, the packet data network gateway may further match, according to the acquired mobility management network element information and serving gateway information and group number information, mobility management network element information and serving gateway information and group number information that are in contexts of all user devices performing accessing via the packet data network gateway. If the matching is successful, the packet data network gateway may acquire its own information (the packet data network gateway information) according to the user device context information.

Alternatively, if the received message includes the mobility management network element information and the serving gateway information and the packet data network gateway information and the group number information, the packet data network gateway may acquire the mobility management network element information and the serving gateway information and the packet data network gateway information and the group number information from the message.

The packet data network gateway updates, according to the acquired information, the context information of the group user device performing accessing via the packet data network gateway. A specific method may be: The packet data network gateway updates the group user device context which has (stores) the mobility management network element information and the serving gateway information and the packet data network gateway information and the group number information or the mobility management network element information and the serving gateway information and the group number information that are acquired by the packet data network gateway according to the message sent by the serving gateway and received in step E 205.

Procedure 2: The gateway equipment acquires that the group information of the group user device changes, instructs the mobility management network element to execute bearer deactivation on the group user device, and executes the bearer deactivation on the group user device.

E 301: The gateway equipment (PGW) receives a PCC message (for example, a Policy and Charging Rules Response message) sent by a policy and charging rules function entity (PCRF), and for example, acquires that a group PCC rule of the user device changes; or, the gateway equipment (for example, the packet data network gateway) receives a message sent by the mobility management network element (for example, the mobility management network element sends a Modify Bearer Command message to the serving gateway, and the serving gateway then sends a Modify Bearer Command message to the packet data network gateway), and acquires that information of the group user device changes (for example, an APN in original subscription data is unavailable in updated subscription data); or, the gateway equipment (for example, the packet data network gateway or the gateway GRPS support node) acquires, through change of configuration information (for example, through O&M interference) that the group information of the group user device changes.

E 302: The packet data network gateway initiates a bearer deactivation procedure for the group user device, and deactivates a context of the group user device. The same mobility management network element information and serving gateway information and packet data network gateway information and group number information may uniquely indicate the group user device. The bearer deactivation procedure may further include a separation procedure.

The packet data network gateway sends a message to the serving gateway. The message may be a delete bearer request (Delete Bearer Request) message. The embodiment does not limit a name of the message. The message includes the mobility management network element information and the packet data network gateway information and the group number information, or may include the mobility management network element information and the serving gateway information and the packet data network gateway information and the group number information, which is not limited by the embodiment.

The packet data network gateway sends the message to the serving gateway, which may be that the message is sent to the serving gateway for the group user device having the same mobility management network element information and serving gateway information and packet data network gateway information and group number information, rather than that multiple existing modify bearer request messages are sent based on user device granularity.

E 303: The serving gateway acquires the mobility management network element information and the serving gateway information and the packet data network gateway information and the group number information according to the message sent by the packet data serving gateway and received in step E 304, and for details, reference may be made to the implementation of step E 203.

The serving gateway may send a message to the mobility management network element. The message may be a delete bearer request (Delete Bearer Request) message. The embodiment does not limit a name of the message. The message sent by the serving gateway may include the packet data network gateway information and the serving gateway information and the group number information, or may include the mobility management network element information and the serving gateway information and the packet data network gateway information and the group number information, which is not limited by the embodiment.

E 304: The mobility management network element acquires the mobility management network element information and the serving gateway information and the packet data network gateway information and the group number information according to the message sent by the serving gateway and received in step E 303, and for details, reference may be made to the implementation of step E 204.

The mobility management network element deactivates, according to the acquired information, the context information of the group user device performing accessing via the mobility management network element. A specific method may be: The mobility management network element deactivates the group user device context which has (stores) the mobility management network element information and the serving gateway information and the packet data network gateway information and the group number information or the serving gateway information and the packet data network gateway information and the group number information that are acquired by the mobility management network element according to the message sent by the serving gateway and received in step E 303.

The mobility management network element may send a message to the serving gateway to confirm that the deactivation of the bearer is completed. The message may be a delete bearer response (Delete Bearer Response) message. The embodiment does not limit a name of the message. The message includes the mobility management network element information and the packet data network gateway information and the group number information, or may include the mobility management network element information and the serving gateway information and the packet data network gateway information and the group number information, which is not limited by the embodiment.

E 305: The serving gateway acquires the mobility management network element information and the serving gateway information and the packet data network gateway information and the group number information according to the message sent by the mobility management network element and received in step E 304, and for details, reference may be made to the implementation of step E 205.

The serving gateway deactivates, according to the acquired information, the context information of the group user device performing accessing via the serving gateway. A specific method may be: The serving gateway deactivates the group user device context which has (stores) the mobility management network element information and the serving gateway information and the packet data network gateway information and the group number information or the mobility management network element information and the packet data network gateway information and the group number information that are acquired by the serving gateway according to the message sent by the packet data serving gateway and received in step E 204.

The serving gateway sends a message to the packet data network gateway to acknowledge that the deactivation of the bearer is completed. The message may be a delete bearer response (Delete Bearer Response) message. The embodiment does not limit a name of the message. The message sent by the serving gateway may include the serving gateway information and the mobility management network element information and the group number information, or may include the mobility management network element information and the serving gateway information and the packet data network gateway information and the group number information, which is not limited by the embodiment.

E 306: The packet data network gateway acquires the mobility management network element information and the serving gateway information and the packet data network gateway information and the group number information according to the message sent by the serving gateway and received in step E 305, and for details, reference may be made to the implementation of step E 206.

The packet data network gateway deactivates, according to the acquired information, the context information of the group user device performing accessing via the packet data network gateway. A specific method may be: The packet data network gateway deactivates the group user device context which has (stores) the mobility management network element information and the serving gateway information and the packet data network gateway information and the group number information or the mobility management network element information and the serving gateway information and the group number information that are acquired by the packet data network gateway according to the message sent by the serving gateway and received in step E 305.

Embodiment 6

Figure 6:
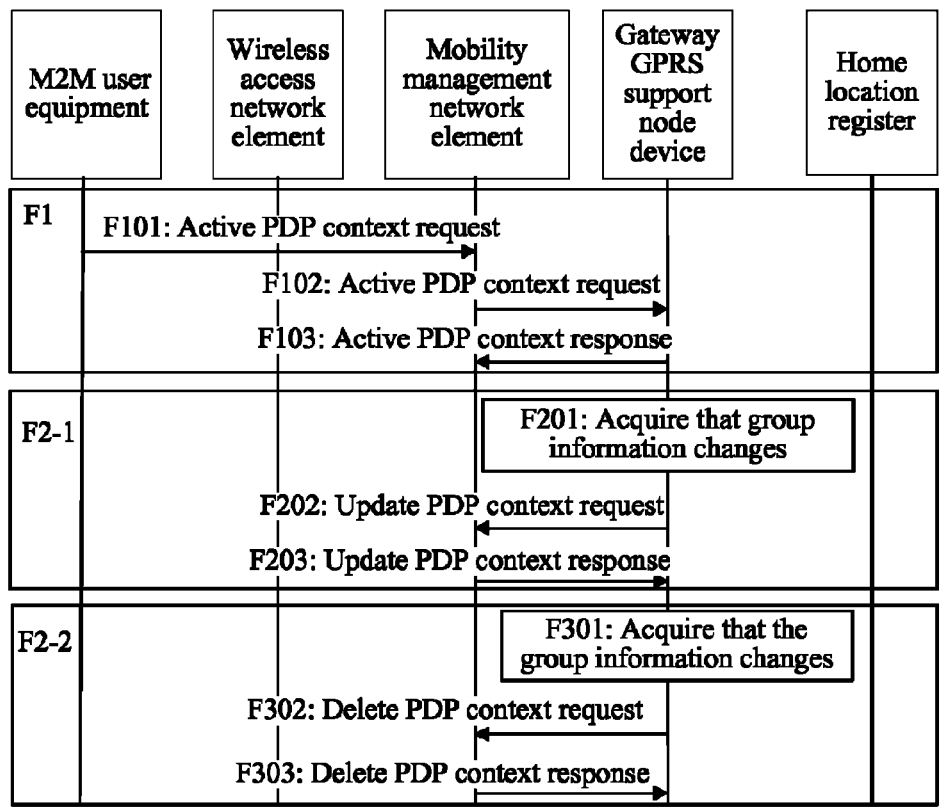
FIG. 6 is a flowchart of a sixth session management method based on an M2M application according to an embodiment of the present invention.

An embodiment of the present invention provides a session management method based on an M2M application, and a procedure, referring to FIG. 6, may specifically include:

F 1: A gateway equipment acquires mobility management network element information and group number information of a group user device.

In this process, a mobility management network element may also acquire gateway equipment information and the group number information of the group user device. For representation forms of the mobility management network element information and the group number information, and the gateway equipment information and the group number information, reference may be made to the description of step A 101 of Embodiment 1. The mobility management network element acquires the gateway equipment information and the group number information of the group user device, and the gateway equipment acquires the mobility management network element information and the group number information of the group user device, and for details, reference may be made to the implementation of step C 1 of Embodiment 3.

F 2: When acquiring that group information of the group user device changes, according to the gateway equipment information and the group number information of the group user device, the gateway equipment instructs the mobility management network element to execute PDP context change processing on the group user device, and executes the PDP context change processing on the group user device.

According to the mobility management network element information and the group number information of the group user device, the gateway equipment instructs the mobility management network element to execute the PDP context change processing on the group user device, and executes the PDP context change processing on the group user device. The PDP context change processing may include a PDP context modification procedure, or may include a PDP context deactivation procedure. A specific procedure may include:

Procedure 1: The gateway equipment acquires that the group information of the group user device changes, instructs the mobility management network element to execute PDP context modification on the group user device, and executes the PDP context modification on the group user device.

F 201: The gateway equipment (GGSN) acquires a PCC message (for example, a Policy and Charging Rules Response message) sent by a policy and charging rules function entity (PCRF), and acquires that a PCC rule of the group user device changes; or, the gateway equipment receives a message sent by the mobility management network element (for example, the mobility management network element sends an Update Bearer Command message to the gateway equipment), and acquires that information of the group user device changes (for example, group QoS information changes); or the gateway equipment acquires, through change of configuration information (for example, through O&M interference), that the group information of the group user device changes.

F 202: A network equipment (a gateway GPRS support node) initiates a PDP context modification procedure for the group user device, and modifies a PDP context of the group user device. The same mobility management network element information and same gateway GPRS support node information and the same group number information may uniquely indicate the group user device.

The gateway GPRS support node sends a message to the mobility management network element to request to update the PDP context. The message may be an update PDP context request (Update PDP Context Request) message. The embodiment does not limit a name of the message. The message may include gateway GPRS support node information and the group number information, or may include the mobility management network element information and gateway GPRS support node information and the group number information, which is not limited by the embodiment.

The gateway GPRS support node sends the message to the mobility management network element, which may be that the message is sent to the gateway GPRS support node for the group user device having the same mobility management network element information and gateway GPRS support node information and group number information, rather than that multiple existing update PDP context request messages are sent based on user device granularity.

F 203: The mobility management network element acquires the mobility management network element information and the gateway GPRS support node information and the group number information according to the message sent by the gateway GPRS support node and received in step F 202, which may be specifically implemented through the following.

If the received message only includes the gateway GPRS support node information and the group number information, the mobility management network element may acquire the gateway GPRS support node information and the group number information from the message. In addition, the mobility management network element may match, according to the acquired gateway GPRS support node information and group number information, gateway GPRS support node information and group number information that are in contexts of all user devices performing accessing via the mobility management network element. If the matching is successful, the mobility management network element may acquire its own information (the mobility management network element information) according to user device context information.

Alternatively, if the received message includes the mobility management network element information and the gateway GPRS support node information and the group number information, the mobility management network element may acquire the mobility management network element information and the gateway GPRS support node information and the group number information from the message.

The mobility management network element updates, according to the acquired information, PDP context information of the group user device performing accessing via the mobility management network element. A specific method may be: The mobility management network element updates a group user device PDP context which has (stores) the gateway GPRS support node information and the group number information or the mobility management network element information and the gateway GPRS support node information and the group number information that are acquired by the mobility management network element according to the message sent by the gateway GPRS support node and received in step F 202.

The mobility management network element sends a message to the gateway GPRS support node to acknowledge that the update of the PDP context is completed. The message may be an update PDP context response (Update PDP Context Response) message. The embodiment does not limit a name of the message. The message sent by the mobility management network element may include the mobility management network element information and the group number information, or may include the mobility management network element information and the gateway GPRS support node information and the group number information, which is not limited by the embodiment.

F 204: The gateway GPRS support node acquires the mobility management network element information and the gateway GPRS support node information and the group number information according to the message sent by the mobility management network element and received in step F 203, which may be specifically implemented through the following.

If the received message only includes the mobility management network element information and the group number information, the gateway GPRS support node may acquire the mobility management network element information and the group number information from the message. In addition, the gateway GPRS support node may further match, according to the mobility management network element information and the group number information, mobility management network element information and group number information that are in contexts of all user devices performing accessing via the gateway GPRS support node. If the matching is successful, the gateway GPRS support node may acquire its own information (the gateway GPRS support node information) according to the user device context information.

Alternatively, if the received message includes the mobility management network element information and the gateway GPRS support node information and the group number information, the gateway GPRS support node may acquire the mobility management network element information and the gateway GPRS support node information and the group number information from the message.

The gateway GPRS support node updates, according to the acquired information, the PDP context information of the group user device performing accessing via the gateway GPRS support node. A specific method may be: The gateway GPRS support node updates the group user device PDP context which has (stores) the mobility management network element information and the group number information or the mobility management network element information and the gateway GPRS support node information and the group number information that are acquired by the gateway GPRS support node according to the message sent by the mobility management network element and received in step F 203.

Procedure 2: Acquire that the group information of the group user device changes, instruct the mobility management network element to execute PDP context deactivation on the group user device, and execute the PDP context deactivation on the group user device.

F 301: The gateway equipment (GGSN) acquires a PCC message (for example, a Policy and Charging Rules Response message) sent by a policy and charging rules function entity (PCRF), and acquires that a PCC rule of the group user device changes; or, the gateway equipment receives a message sent by the mobility management network element (for example, the mobility management network element sends an Update Bearer Command message to the gateway equipment), and acquires that information of the group user device changes (for example, group QoS information changes); or the gateway equipment acquires, through change of configuration information (for example, through O&M interference), that the group information of the group user device changes.

F 302: The network equipment (the gateway GPRS support node) initiates a PDP context deactivation procedure for the group user device, and deactivates a PDP context of the group user device. The same mobility management network element information and gateway GPRS support node information and group number information may uniquely indicate the group user device.

The gateway GPRS support node sends a message to the mobility management network element to request to deactivate the PDP context. The message may be a delete PDP context request (Delete PDP Context Request) message. The embodiment does not limit a name of the message. The message may include the gateway GPRS support node information and the group number information, or may include the mobility management network element information and the gateway GPRS support node information and the group number information, which is not limited by the embodiment.

The gateway GPRS support node sends the message to the mobility management network element, which may be that the message is sent to the gateway GPRS support node for the group user device having the same mobility management network element information and gateway GPRS support node information and group number information, rather than that multiple existing delete PDP context request messages are sent based on user device granularity.

F 303: The mobility management network element acquires the mobility management network element information and the gateway GPRS support node information and the group number information according to the message sent by the gateway GPRS support node and received in step F 302, and for details, reference may be made to the implementation of step F 203.

The mobility management network element deactivates, according to the acquired information, the PDP context information of the group user device performing accessing via the mobility management network element. A specific method may be: The mobility management network element deactivates the group user device PDP context which has (stores) the gateway GPRS support node information and the group number information or the mobility management network element information and the gateway GPRS support node information and the group number information that are acquired by the mobility management network element according to the message sent by the gateway GPRS support node and received in step F 202.

The mobility management network element sends a message to the gateway GPRS support node to acknowledge that the deactivation of the PDP context is completed. The message may be a delete PDP context response (Delete PDP Context Response) message. The embodiment does not limit a name of the message. The message sent by the mobility management network element may include the mobility management network element information and the group number information, or may include the mobility management network element information and the gateway GPRS support node information and the group number information, which is not limited by the embodiment.

F 304: The gateway GPRS support node acquires the mobility management network element information and the gateway GPRS support node information and the group number information according to the message sent by the mobility management network element and received in step F 303, and for details, reference may be made to the implementation of step F 204.

The gateway GPRS support node deactivates, according to the acquired information, the PDP context information of the group user device performing accessing via the gateway GPRS support node. A specific method may be: The gateway GPRS support node deactivates the group user device PDP context which has (stores) the mobility management network element information and the group number information or the mobility management network element information and the gateway GPRS support node information and the group number information that are acquired by the gateway GPRS support node according to the message sent by the mobility management network element and received in step F 203.

Figure 7:
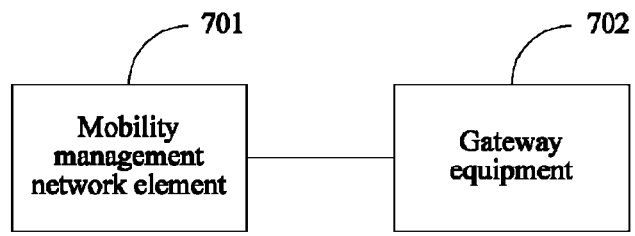
FIG. 7 is a schematic structural diagram of a session management system based on an M2M application according to an embodiment of the present invention.

Correspondingly, an embodiment of the present invention further provides a session management system based on an M2M application, and the system includes a structure shown in FIG. 7: a mobility management network element 701 and a gateway equipment 702.

The mobility management network element 701 is configured to acquire gateway equipment information and group number information of a group user device; acquire that group information of the group user device changes; instruct, according to the gateway equipment information and the group number information of the group user device, the gateway equipment 702 to execute bearer change processing on the group user device; and execute the bearer change processing on the group user device.

The gateway equipment 702 is configured to acquire mobility management network element information and the group number information of the group user device; acquire that the group information of the group user device changes; instruct, according to the mobility management network element information and the group number information of the group user device, the mobility management network element 701 to execute bearer change processing on the group user device; and execute the bearer change processing on the group user device.

The session management system based on an M2M application provided by the embodiment may be used to execute the session management method based on an M2M application provided by the embodiment of the present invention. For a process in which the system performs session management, reference may be made to the session management method based on an M2M application provided by the embodiment of the present invention.

In the session management system based on an M2M application provided by the embodiment, when shared subscription data of an M2M group in a system is updated, related information of the M2M group may be updated in a unified manner according to network equipment resource allocation identifier information pre-allocated to a group user device and based on group granularity, so as to reduce signaling congestion on a network side and correspondingly reduce a network load.

Figure 8:
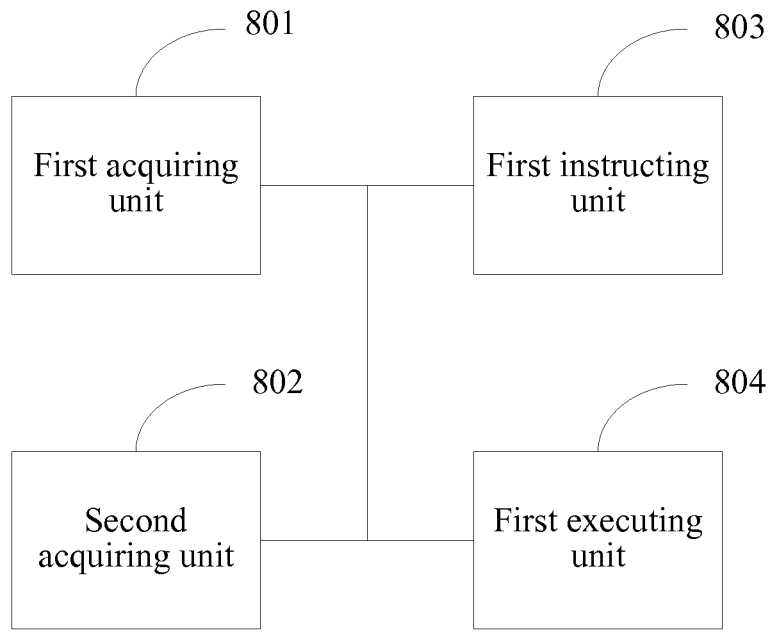
FIG. 8 is a schematic structural diagram of a mobility management network element according to an embodiment of the present invention.

Furthermore, an embodiment of the present invention further provides a mobility management network element. The mobility management network element includes a structure shown in FIG. 8: a first acquiring unit 801, a second acquiring unit 802, a first instructing unit 803, and a first executing unit 804.

The first acquiring unit 801 is configured to acquire gateway equipment information and group number information of a group user device.

The second acquiring unit 802 is configured to acquire that group information of the group user device changes.

The first instructing unit 803 is configured to instruct, according to the gateway equipment information and the group number information of the group user device, a gateway equipment to execute bearer change processing on the group user device.

The first executing unit 804 is configured to execute the bearer change processing on the group user device.

The mobility management network element provided by the embodiment may be configured to execute the session management method based on an M2M application provided by the embodiment of the present invention. For a process in which the mobility management network element performs session management, reference may be made to the session management method based on an M2M application provided by the embodiment of the present invention.

In the mobility management network element provided by the embodiment, when shared subscription data of an M2M group in a system is updated, related information of the M2M group may be updated in a unified manner according to network equipment resource allocation identifier information pre-allocated to a group user device and based on group granularity, so as to reduce signaling congestion on a network side and correspondingly reduce a network load.

Figure 9:
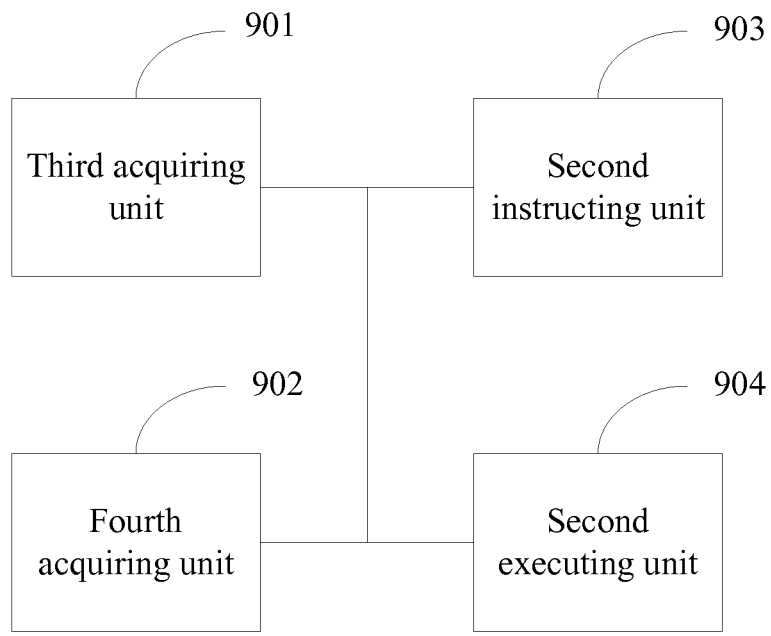
FIG. 9 is a schematic structural diagram of a gateway equipment according to an embodiment of the present invention.

Finally, an embodiment of the present invention further provides a gateway equipment. The gateway equipment includes a structure shown in FIG. 9: a third acquiring unit 901, a fourth acquiring unit 902, a second instructing unit 903, and a second executing unit 904.

The third acquiring unit 901 is configured to acquire mobility management network element information and group number information of a group user device.

The fourth acquiring unit 902 is configured to acquire that group information of the group user device changes.

The second instructing unit 903 is configured to instruct, according to the mobility management network element information and the group number information of the group user device, a mobility management network element to execute bearer change processing on the group user device.

The second executing unit 904 is configured to execute the bearer change processing on the group user device.

The gateway equipment provided by the embodiment may be configured to execute the session management method based on an M2M application provided by the embodiment of the present invention. For a process in which the gateway equipment performs session management, reference may be made to the session management method based on an M2M application provided by the embodiment of the present invention.

In the gateway equipment provided by the embodiment, when shared subscription data of an M2M group in a system is updated, related information of the M2M group may be updated in a unified manner according to group identifier information of a group user device and network identifier information pre-allocated to the group user device and based on group granularity, so as to reduce signaling congestion on a network side and correspondingly reduce a network load.

Persons of ordinary skill in the art should understand that, all of or part of the steps in the foregoing method embodiments may be implemented by a program instructing relevant hardware. The foregoing program may be stored in a computer readable storage medium. When the program is run, the steps of the foregoing method embodiments are performed. The storage medium includes any medium that is capable of storing program codes, such as a ROM (Read-Only Memory, read-only memory), a RAM (Random Access Memory, random access memory), a magnetic disk, and an optical disk.

The foregoing description of the disclosed embodiments makes persons skilled in the art to implement or use the present invention. Multiple modifications to these embodiments are apparent for persons skilled in the art. The general principle defined in the present invention may be implemented in other embodiments without departing from the spirit or scope of the present invention. Therefore, the present invention is not limited to the embodiments described in the document, but is subject to the widest scope that complies with the principle and novelty disclosed in the document.

What is claimed is:

1. A session management method based on a Machine to Machine (M2M) application, the method comprising:
   acquiring gateway equipment information and group number information of a group user device;
   determining that group information of the group user device changes;
   instructing a gateway equipment to execute bearer change processing on the group user device according to the gateway equipment information and the group number information of the group user device; and
   executing the bearer change processing on the group user device;
   wherein the instructing comprises:
   sending, by a mobility management network element, a change request message to a serving gateway according to serving gateway information and packet data network gateway information and the group number information of the group user device, wherein the change request message sent by the mobility management network element comprises mobility management network element information, the packet data network gateway information and the group number information of the group user device;
   sending, by the serving gateway, a change request message to a packet data network gateway, wherein the change request message sent by the serving gateway comprises the serving gateway information, the mobility management network element information and the group number information of the group user device; and
   acquiring, by the packet data network gateway, the mobility management network element information, the serving gateway information, the packet data network gateway information and the group number information of the group user device according to the change request message sent by the serving gateway; and
   executing bearer change processing on a context of the group user device according to the acquired information.

2. The method according to claim 1, wherein the acquiring comprises:
receiving, by a mobility management network element, an access request message sent by the group user device;
sending, by the mobility management network element, a created request message to the gateway equipment, wherein the message comprises mobility management network element information and the group number information of the group user device; and
receiving, by the mobility management network element, the gateway equipment information and the group number information which are of the group user device and returned by the gateway equipment.

3. The method according to claim 2, wherein sending the created request message to the gateway equipment and receiving the gateway equipment information and the group number information comprise:
sending, by the mobility management network element, a created request message to a serving gateway, wherein the created request message sent by the mobility management network element comprises the mobility management network element information and the group number information of the group user device;
sending, by the serving gateway, a created request message to a packet data network gateway, wherein the created request message sent by the serving gateway comprises serving gateway information, and the mobility management network element information and the group number information of the group user device;
sending, by the packet data network gateway, a created response message to the serving gateway, wherein the created response message sent by the packet data network gateway comprises packet data network gateway information and the group number information of the group user device; and
sending, by the serving gateway, a created response message to the mobility management network element, wherein the created response message sent by the serving gateway comprises the serving gateway information, the packet data network gateway information and the group number information of the group user device.

4. The method according to claim 2, wherein sending, the created request message to the gateway equipment and receiving the gateway equipment information and the group number information comprise:
sending, by the mobility management network element, a created request message to a gateway general packet radio service (GPRS) support node, wherein the created request message sent by the mobility management network element comprises the mobility management network element information and the group number information of the group user device; and
sending, by the gateway GPRS support node, a created response message to the mobility management network element, wherein the created response message sent by the gateway GPRS support node comprises gateway GPRS support node information and the group number information of the group user device.

5. The method according to claim 1, wherein executing the bearer change processing comprises:
sending, by a packet data network gateway, a change response message to a serving gateway, wherein the change response message sent by the packet data network gateway comprises packet data network gateway information, mobility management network element information and the group number information of the group user device;
sending, by the serving gateway, a change response message to a mobility management network element, wherein the change response message sent by the serving gateway comprises serving gateway information, the packet data network gateway information and the group number information of the group user device;
acquiring, by the mobility management network element, the mobility management network element information, the serving gateway information, the packet data network gateway information and the group number information of the group user device according to the change response message sent by the serving gateway; and
executing, according to the acquired information, bearer change processing on a context of the group user device.

6. The method according to claim 1, wherein the instructing comprises:
sending, by a mobility management network element, a change request message to a gateway general packet radio service (GPRS) support node according to mobility management network element information and the group number information of the group user device, wherein the change request message sent by the mobility management network element comprises the mobility management network element information and the group number information of the group user device;
acquiring, by the gateway GPRS support node, the mobility management network element information, gateway GPRS support node information and the group number information of the group user device according to the change request message sent by the mobility management network element; and
executing packet data protocol (PDP) context change processing on a context of the group user device according to the acquired information.

7. A session management method based on a Machine to Machine (M2M) application, the method comprising:
acquiring gateway equipment information and group number information of a group user device;
determining that group information of the group user device changes;
instructing a gateway equipment to execute bearer change processing on the group user device according to the gateway equipment information and the group number information of the group user device; and
executing the bearer change processing on the group user device;
wherein executing the bearer change processing comprises:
sending, by a gateway general packet radio service (GPRS) support node, a change response message to a mobility management network element, wherein the change response message sent by the gateway GPRS support node comprises gateway GPRS support node information and the group number information;
acquiring, by the mobility management network element, mobility management network element information, the gateway GPRS support node information and the group number information of the group user device according to the message sent by the gateway GPRS support node; and
executing packet data protocol (PDP) context change processing on a context of the group user device according to the acquired information.

8. A session management method based on a Machine to Machine (M2M) application, the comprising:

acquiring mobility management network element information and group number information of a group user device;

determining that group information of the group user device has changed;

instructing a mobility management network element to execute bearer change processing on the group user device according to the mobility management network element information and the group number information of the group user device; and executing the bearer change processing on the group user device;

wherein the instructing comprises:

sending, by a packet data network gateway, a change request message to a serving gateway according to serving gateway information and the mobility management network element information and the group number information of the group user device, wherein the change request message sent by the packet data network gateway comprises the mobility management network element information, packet data network gateway information and the group number information of the group user device;

sending, by the serving gateway, a change request message to the mobility management network element, wherein the change request message sent by the serving gateway comprises the serving gateway information, the packet data network gateway information and the group number information of the group user device;

acquiring, by the mobility management network element, the mobility management network element information, the serving gateway information, the packet data network gateway information and the group number information of the group user device according to the change request message sent by the serving gateway; and executing bearer change processing on a context of the group user device according to the acquired information.

9. The method according to claim 8, wherein the acquiring comprises:

receiving, by the mobility management network element, an access request message sent by the group user device;

receiving, by a gateway equipment, the mobility management network element information and the group number information which are of the group user device and sent by the mobility management network element; and sending, by the gateway equipment, a created response message to the mobility management network element, wherein the message comprises gateway equipment information and the group number information of the group user device.

10. The method according to claim 9, wherein the receiving the mobility management network element information and the group number information and sending the message to the mobility management network element comprise:

sending, by the mobility management network element, a created request message to a serving gateway, wherein the created request message sent by the mobility management network element comprises the mobility management network element information and the group number information of the group user device;

sending, by the serving gateway, a created request message to a packet data network gateway, wherein the created request message sent by the serving gateway comprises serving gateway information, and the mobility management network element information and the group number information of the group user device;

sending, by the packet data network gateway, a created response message to the serving gateway, wherein the created response message sent by the packet data network gateway comprises packet data network gateway information and the group number information of the group user device; and sending, by the serving gateway, a created response message to the mobility management network element, wherein the created response message sent by the serving gateway comprises the serving gateway information, the packet data network gateway information and the group number information of the group user device.

11. The method according to claim 9, wherein receiving the mobility management network element information and the group number information and sending the created response message to the mobility management network element comprise:

sending, by the mobility management network element, a created request message to a gateway general packet radio service (GPRS) support node, wherein the created request message sent by the mobility management network element comprises the mobility management network element information and the group number information of the group user device; and sending, by the gateway GPRS support node, a created response message to the mobility management network element, wherein the created response message sent by the gateway GPRS support node comprises gateway GPRS support node information and the group number information of the group user device.

12. The method according to claim 8, wherein the instructing comprises:

sending, by a packet data network gateway, a change request message to a serving gateway according to serving gateway information and the mobility management network element information and the group number information of the group user device, wherein the change request message sent by the packet data network gateway comprises the mobility management network element information, packet data network gateway information and the group number information of the group user device;

sending, by the serving gateway, a change request message to the mobility management network element, wherein the change request message sent by the serving gateway comprises the serving gateway information, the packet data network gateway information and the group number information of the group user device;

acquiring, by the mobility management network element, the mobility management network element information, the serving gateway information, the packet data network gateway information and the group number information of the group user device according to the change request message sent by the serving gateway; and executing bearer change processing on a context of the group user device according to the acquired information.

13. The method according to claim 8, wherein executing the bearer change processing on the group user device comprises:

sending, by the mobility management network element, a change response message to a serving gateway, wherein the change response message sent by the mobility management network element comprises the mobility management network element information, packet data network gateway information and the group number information of the group user device;

sending, by the serving gateway, a change response message to a packet data network gateway, wherein the change response message sent by the serving gateway comprises serving gateway information, the mobility management network element information and the group number information of the group user device;

acquiring, by the packet data network gateway, the mobility management network element information, the serving gateway information, packet data network gateway information and the group number information of the group user device according to the change response message sent by the serving gateway; and executing bearer change processing on a context of the group user device, according to the acquired information.

14. The method according to claim 8, wherein the instructing comprises:

sending, by a gateway general packet radio service (GPRS) support node, a change request message to the mobility management network element according to the mobility management network element information and the group number information of the group user device, wherein the change request message sent by the gateway support node comprises gateway GPRS support node information and the group number information of the group user device;

acquiring, by the mobility management network element, the mobility management network element information, the gateway GPRS support node information and the group number information of the group user device according to the change request message sent by the gateway GPRS support node; and executing packet data protocol (PDP) context change processing on a context of the group user device, according to the acquired information.

15. A session management method based on a Machine to Machine (M2M) application, the comprising:

acquiring mobility management network element information and group number information of a group user device;

determining that group information of the group user device has changed;

instructing a mobility management network element to execute bearer change processing on the group user device according to the mobility management network element information and the group number information of the group user device; and executing the bearer change processing on the group user device;

wherein executing the bearer change processing on the group user device comprises:

sending, by the mobility management network element, a change response message to a gateway general packet radio service (GPRS) support node, wherein the change response message sent by the mobility management network element comprises the mobility management network element information and the group number information of the group user device;

acquiring, by the gateway GPRS support node, the mobility management network element information, gateway GPRS support node information and the group number information of the group user device according to the change response message sent by the mobility management network element; and executing packet data protocol (PDP) context change processing on a context of the group user device according to the acquired information.

* * * * *